United States Patent [19]

Kirihata et al.

[11] Patent Number: 4,849,737
[45] Date of Patent: Jul. 18, 1989

[54] PERSON-NUMBER DETECTING SYSTEM

[75] Inventors: Shinji Kirihata; Tsunehiko Araki; Yuuki Yorifuji; Takashi Horii; Hiroshi Matsuda; Hidekazu Himezawa, all of Kadoma, Japan

[73] Assignee: Matsushita Electric Works, Ltd., Osaka, Japan

[21] Appl. No.: 123,105

[22] Filed: Nov. 19, 1987

[30] Foreign Application Priority Data

| Nov. 26, 1986 | [JP] | Japan | 61-281301 |
| Nov. 26, 1986 | [JP] | Japan | 61-281309 |
| Nov. 26, 1986 | [JP] | Japan | 61-281310 |
| Apr. 24, 1987 | [JP] | Japan | 62-101336 |
| May 26, 1987 | [JP] | Japan | 62-79359[U] |

[51] Int. Cl.⁴ ............................................. G08B 13/18
[52] U.S. Cl. .................................... 340/567; 250/342
[58] Field of Search ............... 340/567, 518; 250/342, 250/349, 353, 334, 347; 358/105, 108, 113, 84; 350/628; 318/65; 455/2

[56] References Cited

U.S. PATENT DOCUMENTS

| 3,493,953 | 2/1970 | Taylor | 340/529 |
| 3,889,117 | 6/1975 | Shaw, Jr. | 250/334 X |
| 4,636,774 | 2/1987 | Galvin et al. | 340/565 |
| 4,769,697 | 9/1988 | Gilley et al. | 250/342 X |

Primary Examiner—Glen R. Swann, III
Assistant Examiner—Thomas J. Mullen, Jr.
Attorney, Agent, or Firm—Burns, Doane, Swecker & Mathis

[57] ABSTRACT

A person-number detecting system which comprises a detector for detecting infrared rays emitted from persons' bodies to generate an output signal while a scanning optical means circularly scans a visual field of the infrared ray detector, a means for amplifying the output signal of the detector, a means for converting it to a signal necessary for detection of the number of persons located within the field, a means for discriminating the number of persons on the basis of the converted signal, and a means for outputting person number information. The system can be made simple and inexpensive, while realizing a highly precise detection of the number of persons in a wide detection zone.

24 Claims, 30 Drawing Sheets

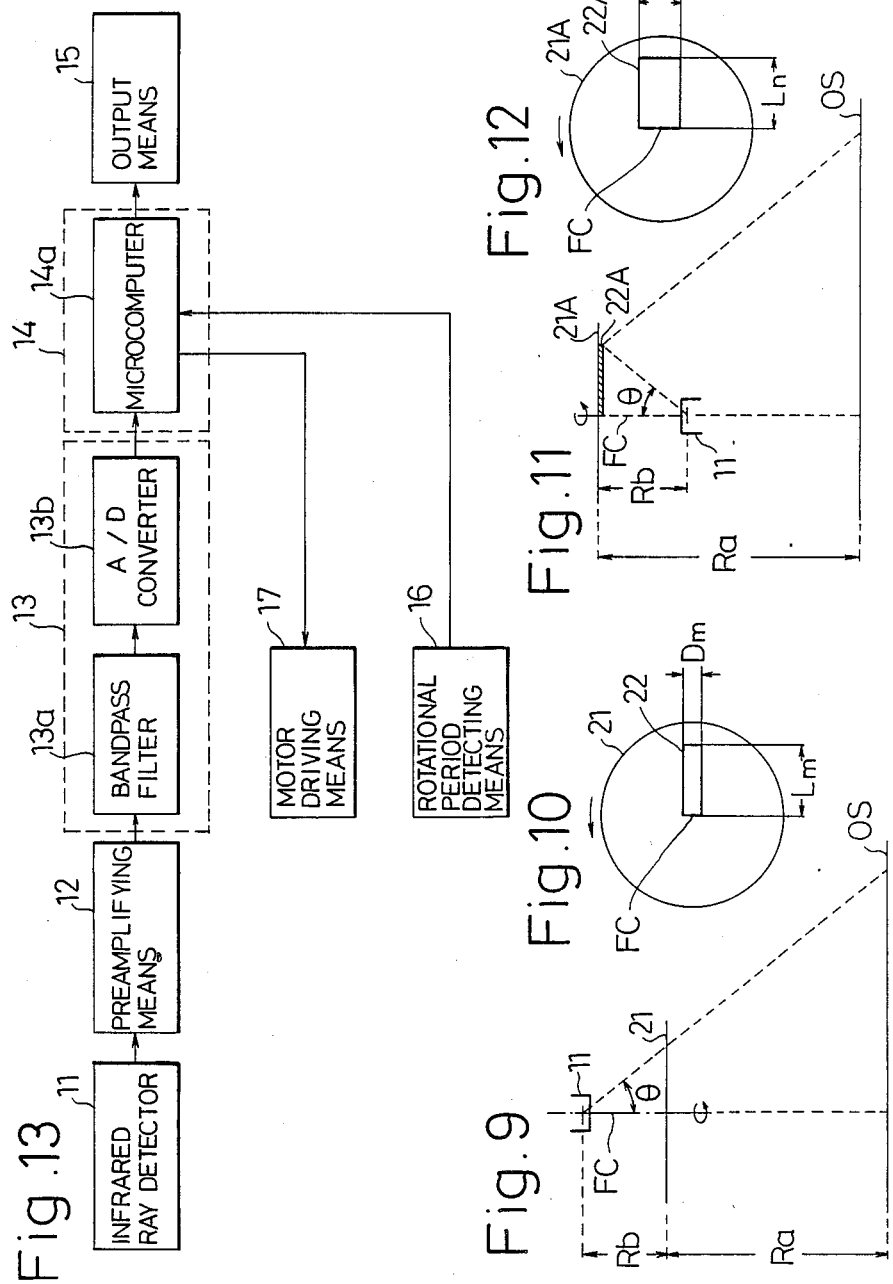

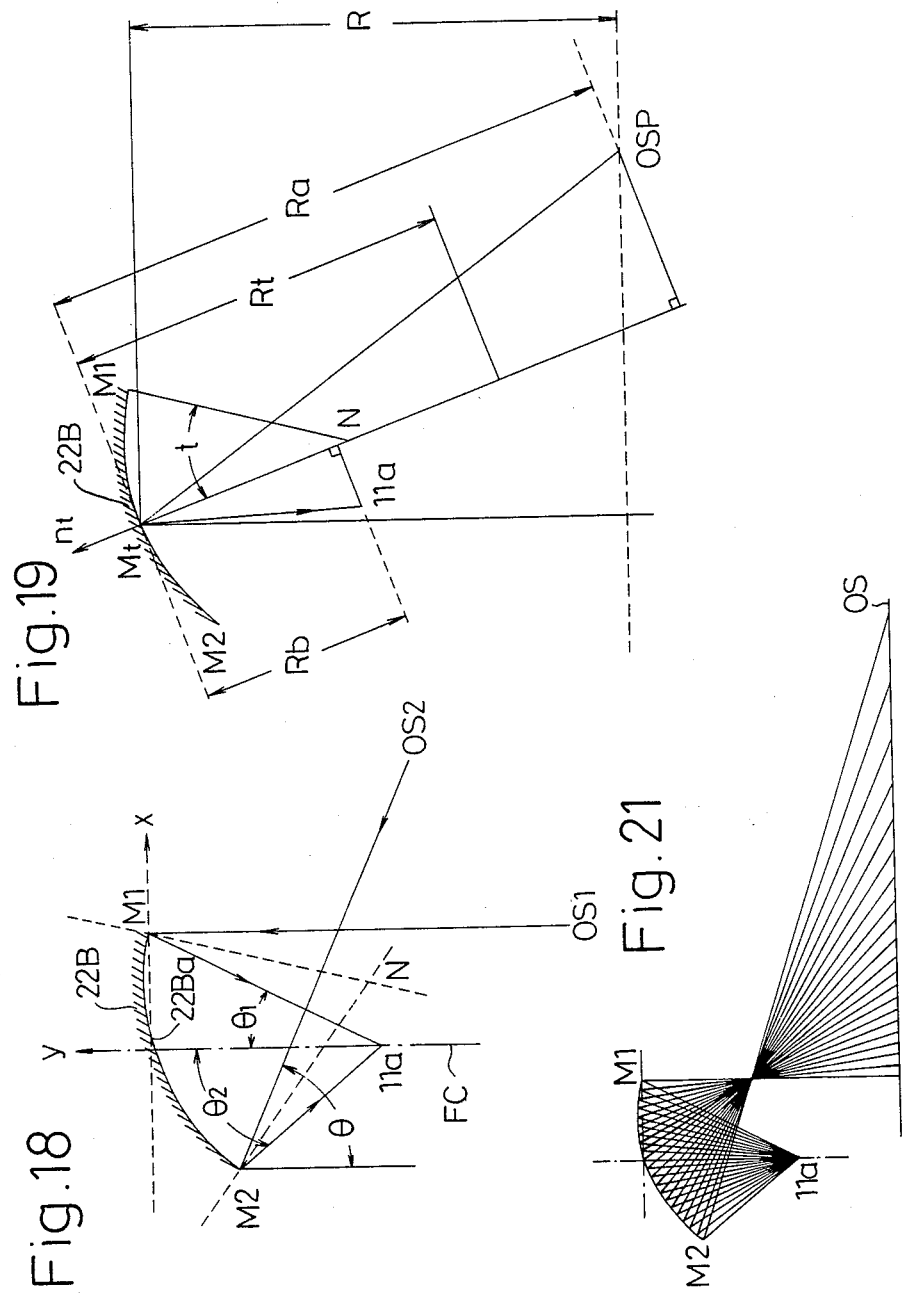

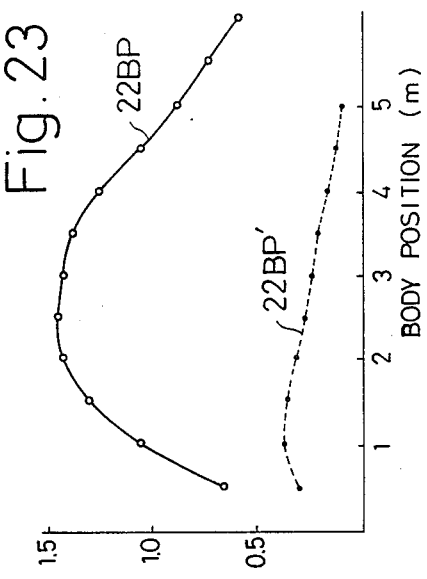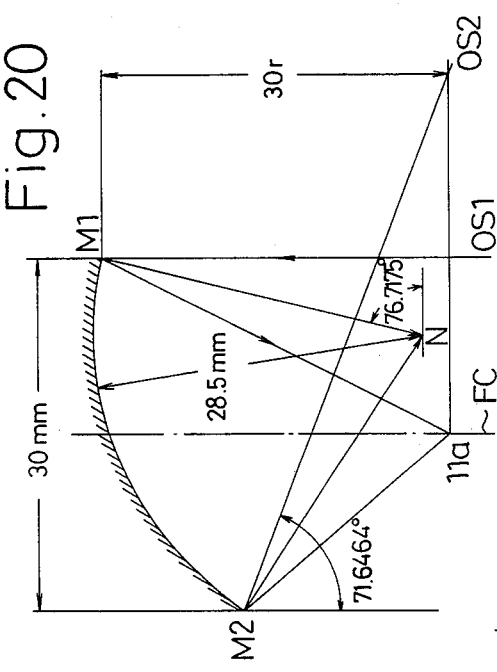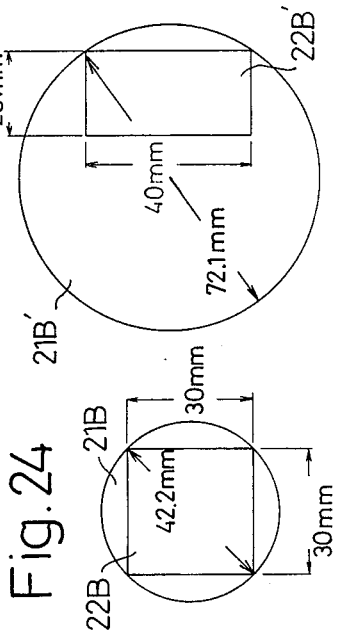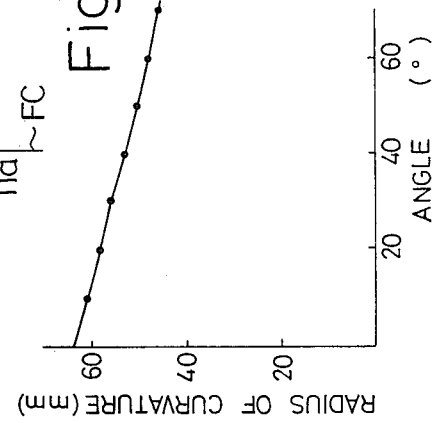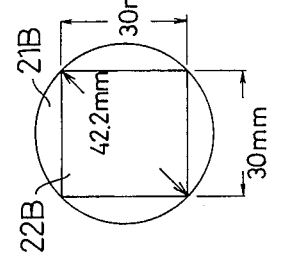
Fig. 23
Fig. 25
Fig. 24
Fig. 20
Fig. 22

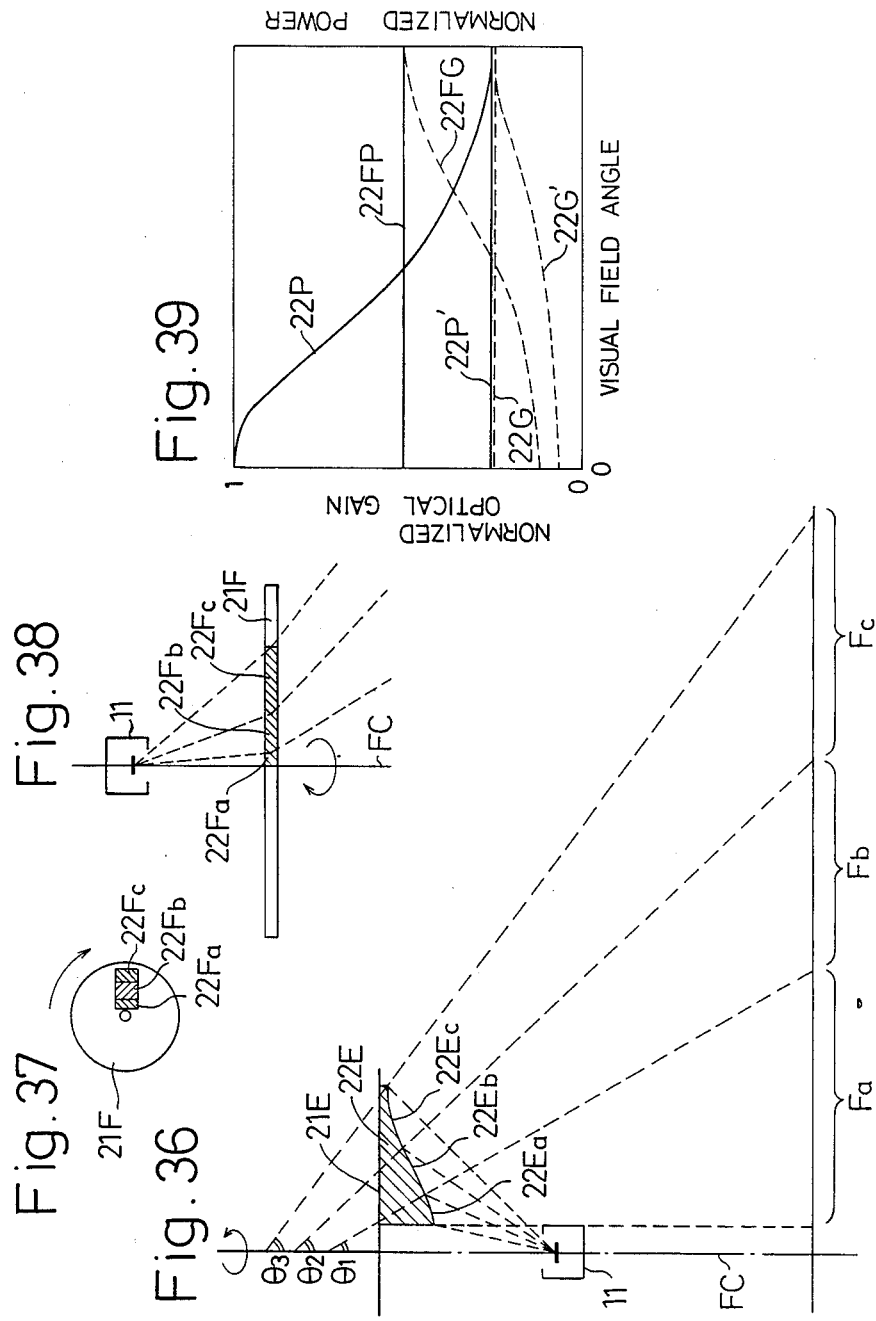

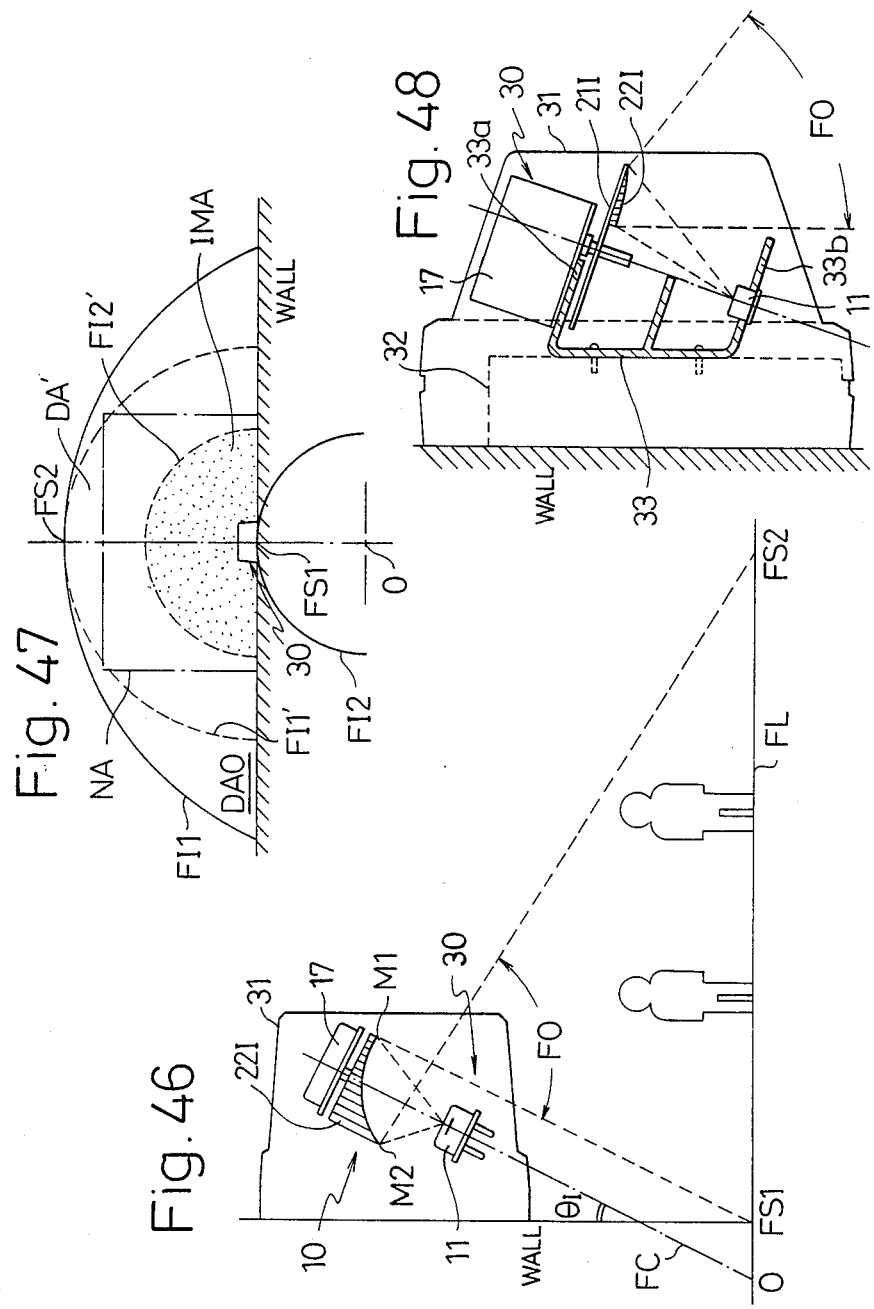

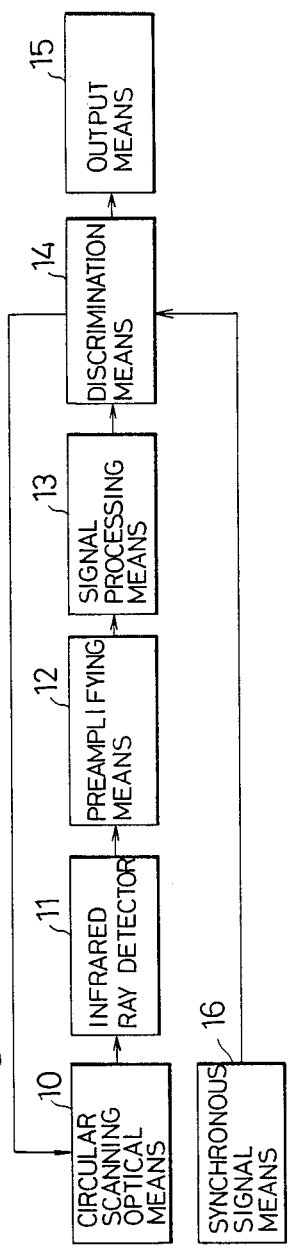
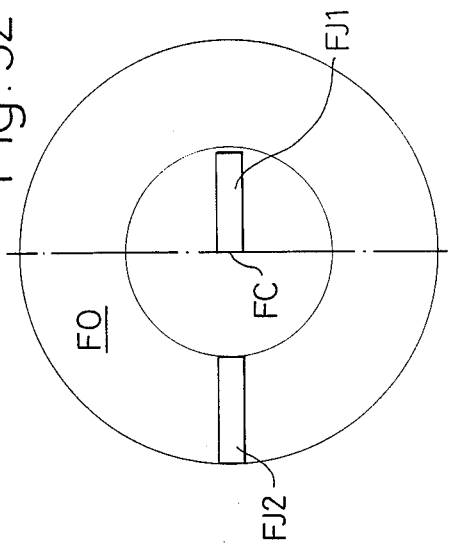
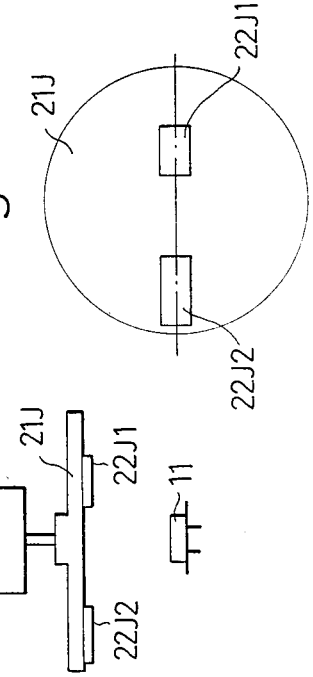
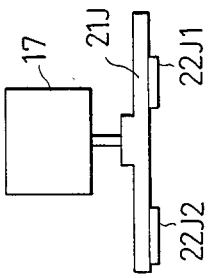

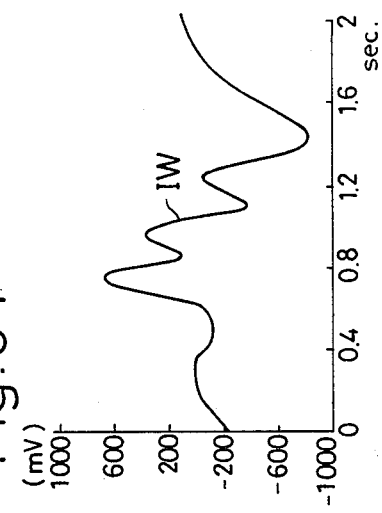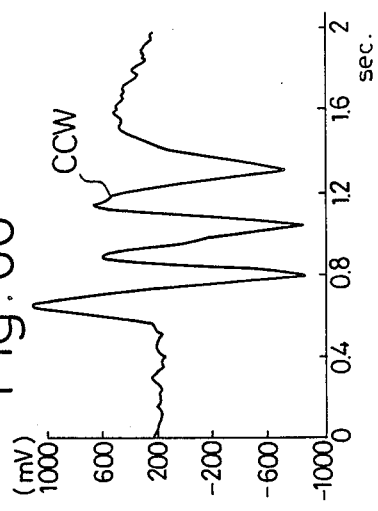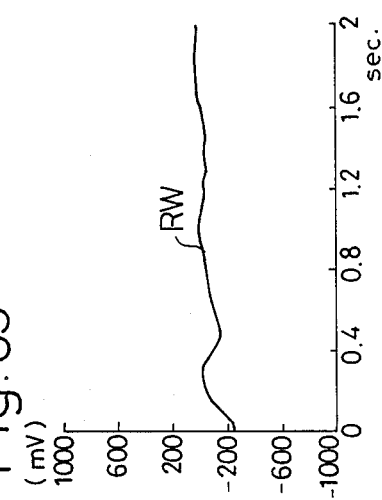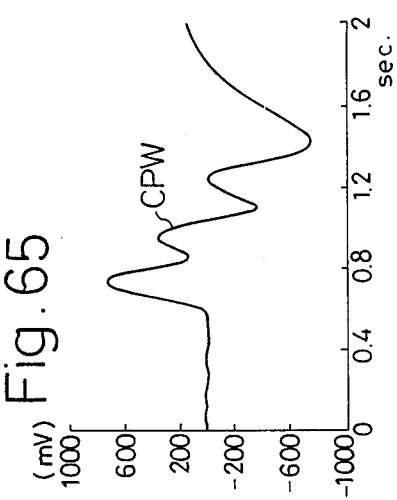

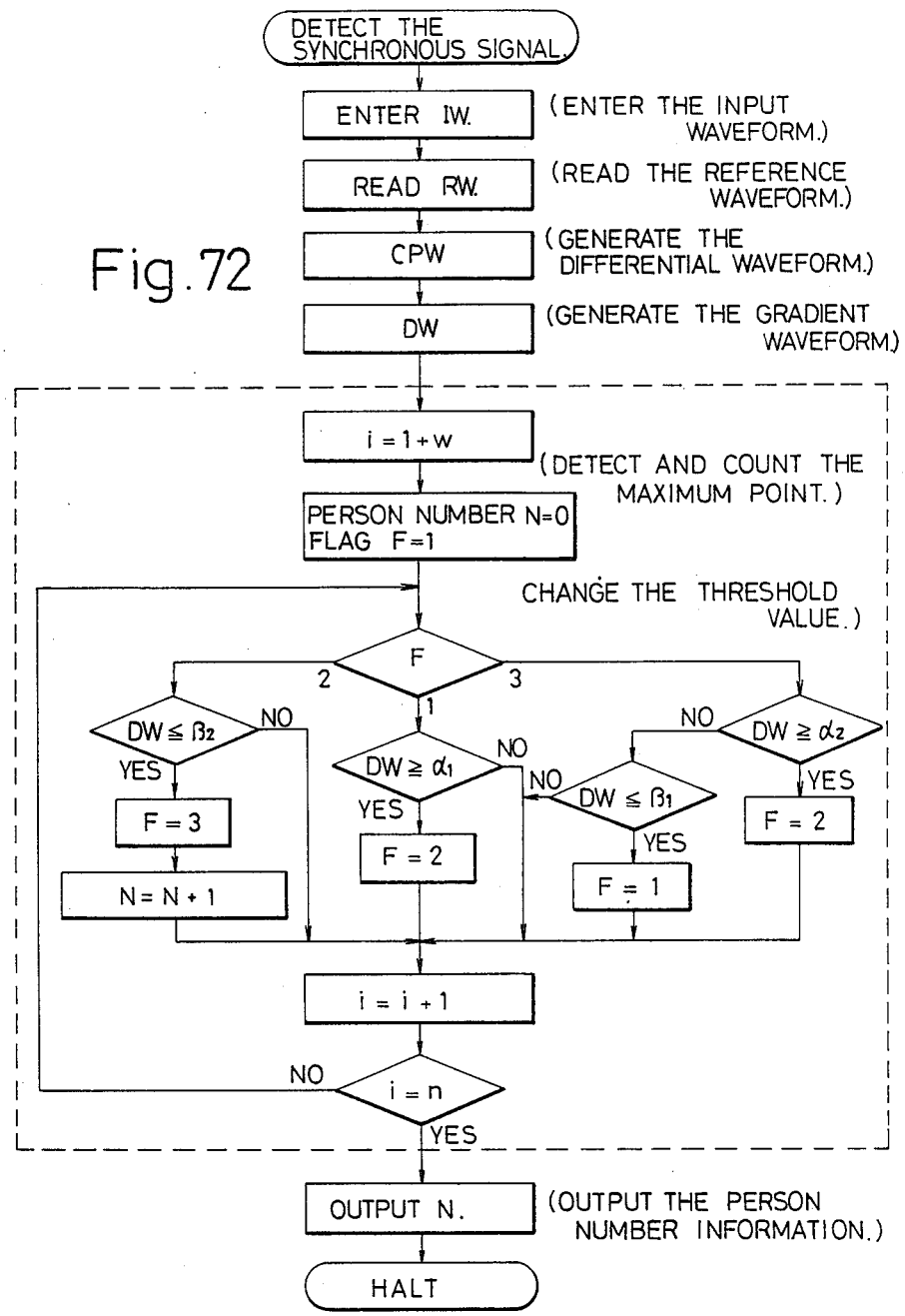

Fig. 80
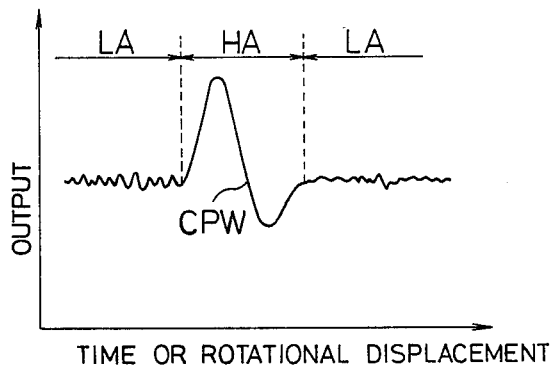
Fig. 81
(a)
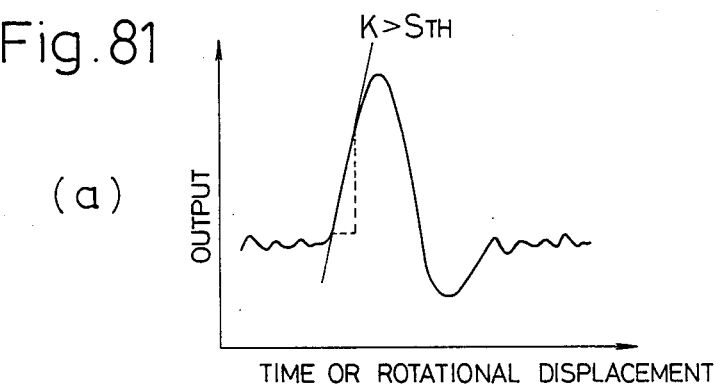
(b)
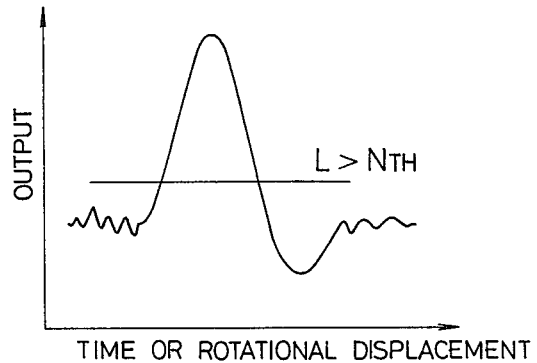

PERSON-NUMBER DETECTING SYSTEM

TECHNICAL BACKGROUND OF INVENTION

This invention relates to a person-number detecting system of an infrared-ray receiving type which detects infrared rays emitted from persons to be detected and discriminates the number of such persons.

The person-number detecting systems of the kind referred to are installed, for example, in a room to detect information regarding the number of persons present in the room and to effectively grasp the room state.

DISCLOSURE OF PRIOR ART

In general, when it is desired to detect the numbers of persons going in and out of respective rooms of a hotel equipped with many rooms, a building having conference facilities and the like, such a system can be employed that television cameras are installed at the entrances and exits of the respective rooms and more than one check operator visually checks the respective numbers of persons on displays arranged in a centralized supervisory room or the like. However, such a system involves its high installation cost and much labor of the check operators. Therefore, it is desirable to realize automatic person-number detection. To this end, there can be considered such a system that picture data on detection areas are obtained by television cameras and subjected to a suitable picture processing to obtain a discrimination output indicative of the numbers of persons going in and out of rooms. In such a system, person-number measurement will be carried out generally by detecting persons' bodies on the basis of luminance variation in visible light. In which case, however, it is estimated that the detection accuracy cannot be maintained at a high level because of its poor S/N ratio and insufficient resolution.

Disclosed in U.S. Pat. No. 4,636,774 by A. A. Galvin et al. is a dimmer system which can be employed as a person-number detecting system. This system, however, has had such a problem that it cannot discriminate stationary persons nor detect the number of them because it can detect only a moving object.

Further, U.S. Pat. No. 3,493,953 by D. S. Taylor teaches a flame searcher which comprises an arcuate mirror pivotably supported for 360-degree rotation and an infrared ray detector receiving light reflected by the mirror, and which is arranged so that the mirror is rotationally scanned to detect fire flame and when the infrared ray detector detects the flame, the rotation of the mirror is stopped to index the flame generation position. Thus, the searcher may be applicable to a detection of infrared rays emitted from persons' bodies and thus immediately utilizable in detecting the positions of persons because the mirror is stopped upon detection of the infrared ray higher than a predetermined level. However, Taylor discloses nothing of the person number detection nor of any reference to a momentarily achieved visual field of the detection, and the searcher of Taylor should not be readily applicable to the system for accurately determining the number of persons present.

SUMMARY OF THE INVENTION

It is an object of the present invention, therefore, to provide a system which can realize highly precise detection of the number of persons present in a wide detection zone with a simplified and inexpensive arrangement.

According to the present invention, the above object is attained by providing a person-number detecting system which comprises a detector for detecting infrared rays emitted from persons' bodies, means for amplifying an output signal of the detector, a signal processing means for converting an amplified output of the amplifying means to a signal necessary for detection of the number of persons, means for discriminating the number of persons on the basis of an output signal of the signal processing means, and means for outputting person-number information, and which is characterized in that a visual field of the infrared ray detector is circularly scanned by a scanning optical means.

Other objects and advantages of the present invention shall be made clear in the following description of the invention detailed with reference to preferred embodiments shown in accompanying drawings.

BRIEF EXPLANATION OF DRAWINGS

FIG. 9 is a diagram for explaining an embodiment of a circular scanning optical means used in the system of FIG. 1;

FIG. 10 is a bottom view of a major part of the optical means of FIG. 9;

FIG. 11 is a diagram for explaining another embodiment of the circular scanning optical means used in the system of FIG. 1;

FIG. 12 is a bottom view of a major part of the optical means of FIG. 11;

FIG. 13 is a more detailed block diagram of the person-number detecting system of FIG. 1;

FIGS. 18 to 20 are diagrams for explaining the operation of the mirror of FIG. 17;

FIG. 21 is a diagram showing a condensing state of the mirror of FIG. 17;

FIG. 22 is a graph showing a variation in the curvature radius of the mirror of FIG. 17;

FIG. 23 is a graph showing a condensing ability of the mirror of FIG. 17;

FIGS. 24 and 25 are diagrams showing how the mirror of FIG. 17 is mounted on a rotary disc, respectively;

FIG. 36 is a diagram for explaining still another embodiment of the circular scanning optical means used in the person-number detecting system according to the present invention;

FIG. 37 is a bottom view of a major part of the optical means of FIG. 36;

FIG. 38 is a schematic view for explaining another embodiment of the invention in which a Fresnel lens is employed in place of the mirror of FIG. 36;

FIG. 39 shows operational characteristics of the optical means of FIG. 36 as contrasted with those of the optical means of FIG. 11;

FIG. 46 is diagram for explaining another embodiment of the circular scanning optical means used in the person-number detecting system according to the present invention;

FIG. 47 is a diagram for explaining a detection zone of the optical means of FIG. 46;

FIG. 48 is a diagram for explaining another embodiment of the circular scanning optical means used in the person-number detecting system according to the present invention;

FIG. 49 is a block diagram of yet another embodiment of the person-number detecting system according to the present invention;

FIG. 50 is a diagram for explaining major part of the circular scanning optical means used in the system of FIG. 49;

FIG. 51 is a bottom view of a major part of the optical means of FIG. 50;

FIGS. 52 to 54 are diagrams for explaining the visual field of the optical means of FIG. 50;

FIGS. 63 to 66 are graphs showing the operation of the system of FIG. 62;

FIG. 72 is a flowchart for explaining the operation of the system of FIG. 71;

FIGS. 80 and 81 are graphs showing the operation of the system of FIG. 79;

Figure 1:
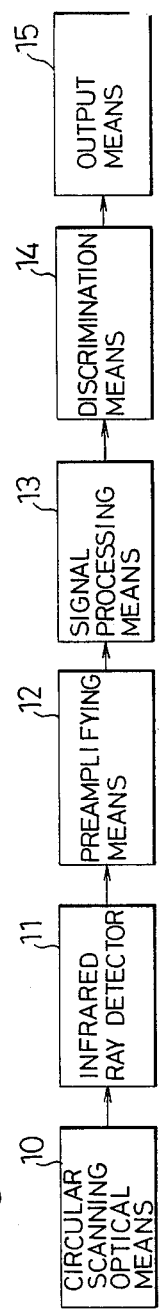
FIG. 1 is a block diagram of an embodiment of a person-number detecting system according to the present invention.

While the present invention shall now be described with reference to the preferred embodiments shown in the drawings, it should be understood that the intention is not to limit the invention only to the particular embodiments shown but rather to cover all alterations, modifications and equivalent arrangements possible within the scope of appended claims.

DISCLOSURE OF PREFERRED EMBODIMENTS

Referring to FIG. 1, a person-number detecting system according to the present invention comprises a circular scanning optical means 10 and an infrared ray detector 11, in which the optical means 10 is optically associated with the infrared ray detector 11 to scan the visual field of the detector 11. An output signal of the infrared ray detector 11 is sent to a preamplifying means 12 to be amplified, the amplified output of the amplifying means 12 is sent to a signal processing means 13 to be converted to a signal necessary for detection of the number of persons, and the converted signal is sent to a discrimination means 14 which discriminates the number of persons on the basis of the output signal of the signal processing means 13 and sends a discrimination signal to an output means 15 which in turn outputs person-number information.

Figure 3:
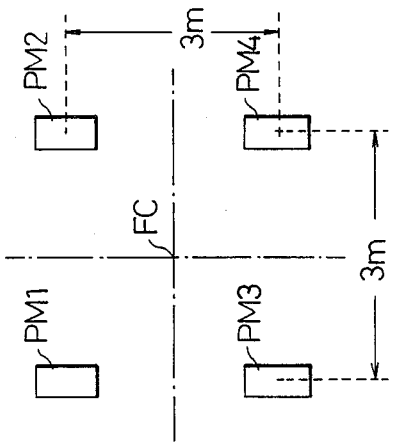
FIGS. 2 to 4 are diagrams for explaining the detection by the system of FIG. 1 with models of persons used.
Figure 2:
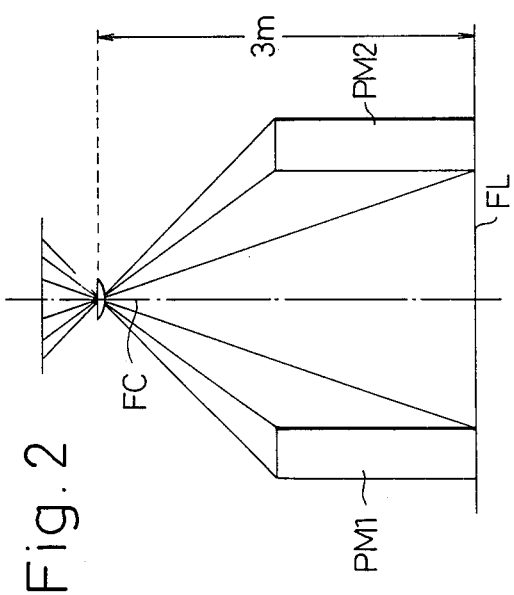
Figure 5:
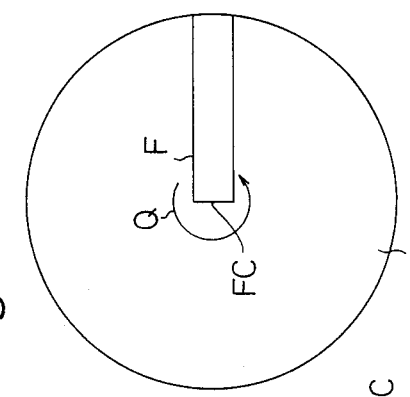
FIG. 5 is a diagram for explaining circular scanning of the system of FIG. 1.
Figure 6:
FIG. 6 is a waveform showing a relationship between incident energy of the system of FIG. 1 and elapsed time.
Figure 4:
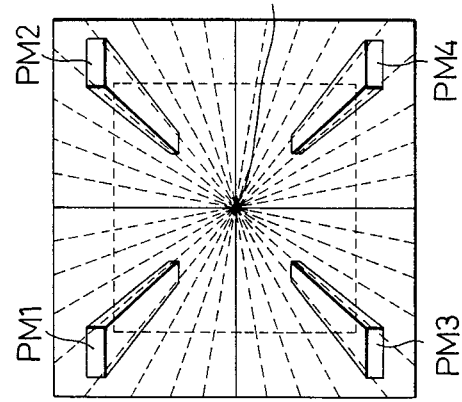

More specifically, when four person models PM1 to PM4 each having, for example, height of 170 cm, a width of 50 cm and a thickness of 20 cm are positioned on a floor FL at four corners of, for example, a regular square zone of each 3 m side, as equally spaced from a visual field center line FC vertically passing through the detector 11 as shown in FIGS. 2 and 3, images of the person models PM1 to PM4 as viewed from, for example, 3 m high above the floor FL are extended as gradually expanded in width radially from the visual field center FC, as seen in FIG. 4. Now, when the optical means 10 for scanning a visual field F of the infrared ray detector 11 causes the so-called slit-shaped visual field F having a certain area to be rotated by an angle of 360 degrees in a direction shown by an arrow Q about the visual field center FC as the rotary center as shown in FIG. 5, that is, when the means 10 performs its circular scanning function, a full effective field FO is established. Under such a condition, if the temperature of the person models PM1 to PM4 is set to be relatively higher than that of the floor FL, then infrared ray energies emitted from the person models PM1 to PM4 are made incident on the infrared ray detector 11 every time when the slit-shaped field F catches the respective person models PM1 to PM4, as shown in FIG. 6.

Figure 7:
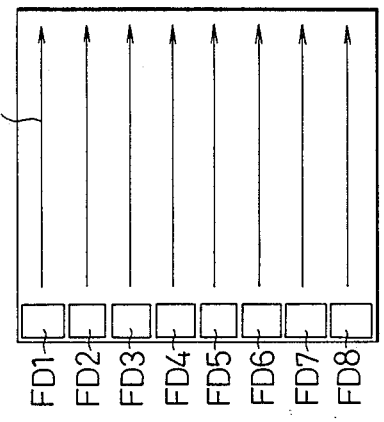
FIG. 7 is a diagram for explaining parallel scanning shown as contrasted with FIG. 5.
Figure 8:
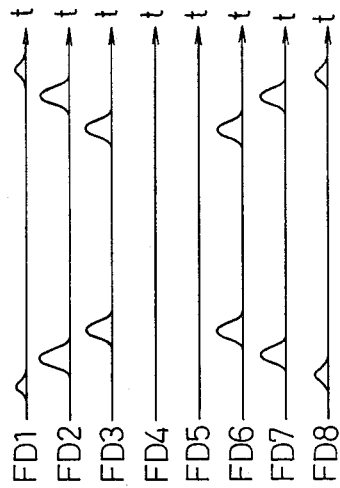
FIG. 8 shows waveforms of incident energies of detectors obtained by the parallel scanning of FIG. 7.

In this case, since the slit-shaped field to be circularly scanned is extended radially from the rotational center and the images of the person models PM1 to PM4 are extended radially with respect to the slit-shaped field as already explained in connection with FIG. 4, an overlapped area of the slit-shaped field F with each of the images of the person models becomes relatively large in the plan view. As a result, the detection sensitivity of the system to objects to be detected is remarkably improved. The optical means 10 for circularly scanning the field F has a great advantage over, for example, an optical means for performing the parallel scanning. That is, when, for example, eight infrared ray detectors FD1 to FD8 are arranged in a one-dimensional array as shown in FIG. 7 to detect the four person models PM1 to PM4 located as shown in FIGS. 2 to 4, the infrared ray detectors receive such infrared ray energies as shown in FIG. 8 respectively. In this case, infrared rays emitted from two of the person models PM1 and PM2 are received by the detectors FD1 to FD3 while infrared rays emitted from the remaining person models PM3 and PM4 are received by the detectors FD6 to FD8. That is, since each detector receives twice the energy incident and two of the energy incident are present simultaneously, a signal processing means for the output signals of the array detectors FD1 to FD8 becomes complicated to render the means expensive. With the circular scanning arrangement, on the other hand, the infrared ray detector 11 receives the incident energy of infrared ray only each time when the slit-shaped field F catches each object to be detected, so that such a complicated signal processing means as mentioned in connection with the parallel scanning optical means becomes unnecessary and the scanning optical system and signal processing arrangement can be simplified to a large extent, as will be readily appreciated.

Referring to FIG. 9, there is shown a more practical embodiment of the circular scanning optical means 10, which includes a rotary disc 21 provided therein with a slit 22 that is extended radially from its center and has a predetermined length of Lm and a predetermined width of Lm (refer also to FIG. 10). The disc 21 is arranged to be rotated about the visual field center FC by such a driving mechanism (not shown) as a motor or the like. The disc 21 is spaced by a predetermined distance Ra from an object surface OS and also by a predetermined distance Rb from the infrared ray detector 11. In the case of this circular optical scanning means 10, only part of infrared rays radiated from the object surface OS and passed through the slit 22 can be received by the infrared ray detector 11.

The circular scanning type optical means 10 in the illustrated embodiment is arranged for obtaining on the object surface OS a momentary visual field of a length Lv and a width Dv which are determined by such equations as:

$$Lv=\{(Ra+Rb)/Rb\}\cdot Lm, \quad Dv=\{(Ra+Rb)/Rb\}\cdot Dm$$

The optical means 10 is also provided to meet a relationship $\theta=\tan^{-1}Lm/Rb$, where $\theta$ is a depth angle at which the momentary visual field can view the object surface OS in the radial direction of the detector in the circular scanning. In this case, it will be appreciated that the momentary visual field is circularly scanned about the visual field center FC as the rotary axis in the light receiving surface of the infrared ray detector 11 and thus the full depth angle of the momentary visual field with respect to the object surface OS will be $2\theta$.

In the circular scanning optical means 10 of FIGS. 9 and 10, the person-number resolution ability can be improved by making the momentary visual field width Dv smaller and thus it is desired to make the width Dm of the slit 22 smaller. However, this also causes received light amount at the infrared ray detector 11 to be reduced and thus the S/N ratio lowered. In this connection, by mounting in the slit 22 a cylindrical lens having a condensing action in the scanning direction, a predetermined value of the momentary visual field width Dv and a high optical gain can be obtained. When such a cylindrical lens is mounted in the slit 22, the momentary visual field length and width Lv and Dv are obtained from equations $$Lv=\{(Ra+Rb)/Rb\}\cdot Lm, \quad Dv=(Ra/Rb)\cdot d$$

where d is the diameter of the light receiving surface of the infrared ray detector 11. Therefore, the desired momentary visual field width Dv can be obtained by suitably selecting the distance Rb between the rotary disc 21 and detector 11 or the diameter d of the infrared ray detector 11, independently of the width Dm of the slit 22, i.e., the width of the cylindrical lens. When the cylindrical lens is mounted in the slit 22, the optical gain can be increased by enlarging the width Dm of the slit 22, i.e., the width of the cylindrical lens.

Turning to FIGS. 11 and 12, there is shown another embodiment of the circular scanning optical means 10, in which concave cylindrical mirror 22A is attached to a rotary disc 21A above the infrared ray detector 11 as spaced by the distance Rb from the element 11 and the rotary disc 21A itself is provided to be rotated by a motor or the like about the visual field center FC passing through the center of the detector 11 as the rotary axis. Under this condition, the momentary visual field length and width Lv and Dv are obtained from the following equations, substantially in the same manner as in the case where the cylindrical lens is used, $$Lv = \{(Ra+Rb)/Rb\} \cdot Ln, \quad Dv = (Ra/Rb) \cdot d$$

where, Ra is a distance from the cylindrical mirror 22A to the object surface OS, Ln is a mirror length, Dn is a mirror width and d is the diameter of the light receiving surface of the infrared ray detector 11. That is, the desired momentary visual field width Dv can be obtained by suitably selecting the distance Rb or the diameter d, while the optical gain can be increased by enlarging the mirror width Dn. Further, the depth angle $\theta$ of the momentary radial visual field on the object surface OS with respect to the detector becomes $\tan^{-1} Ln/Rb$ and the full depth angle becomes $2\theta$.

In an event where a motor is used as a means for driving the rotary disc and if the ordinary motor causes any trouble to occur in the infrared ray detection, then it is desirable to employ such an annular ultrasonic wave motor that has a cavity in its rotary center part.

Figure 14:
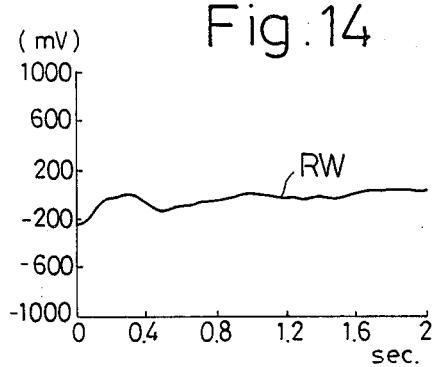
FIGS. 14 to 16 are graphs showing the operation of the system of FIG. 13.
Figure 15:
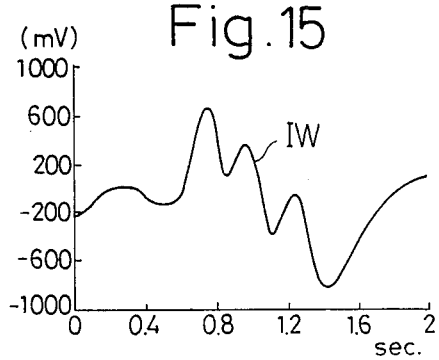
Figure 16:
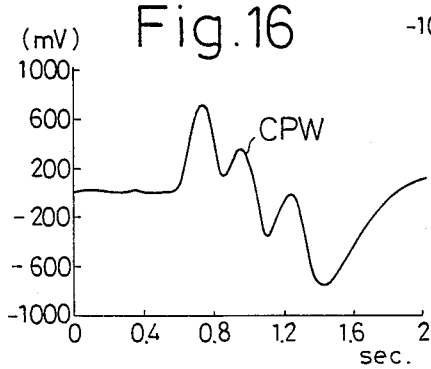

A more detailed arrangement of the person-number detecting system of FIG. 1 will be explained. An inexpensive pyroelectric element requiring no cooling may be employed for the infrared ray detector 11. In this case, an output of the pyroelectric element contains many low frequency components as background noise, and a band pass filter 13a is provided in the signal processing means 13 to remove the low frequency components from the amplified output of the preamplifier 12 as shown in FIG. 13. Simultaneously with the removal of the low frequency components, unnecessary high frequency components are also removed from the amplified output to improve the S/N ratio. The noise removed output is then sent to an A/D converter 13b included in the processing means 13 to be A/D converted and further sent to a microcomputer 14a constituting a discrimination means 14. The microcomputer 14a is receiving a synchronous signal from a rotational period detecting means 16 each time when the circular scanning optical means 10 performs the circular scan, and energizes the A/D converter 13b to receive an output of the converter upon each circular scan. The microcomputer 14a, which previously stores in its memory an output waveform when no person is present in the full effective visual field FO, i.e., in the detection zone, as a reference waveform, compares therewith the input waveform received from the A/D converter 13b. When the microcomputer previously stores such a reference waveform RW as shown in FIG. 14 and receives an input having such a waveform IW as shown in FIG. 15, it subtracts the reference waveform from the input waveform to form such a compared waveform CPW as shown in FIG. 16, detects maximum points from the compared waveform CPW, judges in the illustrated waveform the presence of "three persons", and prepares compared waveform date. In an event where the computer is arranged to renew the reference waveform with every new input waveform received so that, even if an environmental change in the detection zone takes place, the computer can prepare the compared waveform data highly precisely so as not to be influenced by the environmental change. The computer 14a also generates a control signal to control a driving means 17 for the motor which drives the rotary disc in the circular scanning optical means 10.

The compared waveform data is sent to an output means 15 which is arranged to indicate the data on the basis of the person-number information. For example, in an event where the person-number detecting system is installed at a conference room, the output means 15 is installed outside the room so that an operator can observe the use or no use state of the room or how the room is crowded. Further, when the output means 15 is installed outside a private room, such information as "absence", "presence" or "visitor" can be provided on the basis of such person-number information as "0", "1", "2" or more than 2 persons. In addition, various environmental facilities including an air conditioner, illumination and the like can be stably and effectively operated on the person-number information regarding rooms such as a conference room, a private room and the like.

Figure 17:
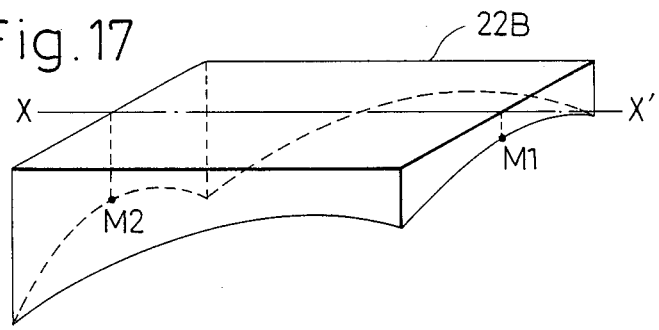
FIG. 17 is a perspective view of an embodiment of a mirror employed in the person-number detecting system in accordance with the present invention.

According to another feature of the present invention, the circular scanning optical means explained in connection with FIGS. 11 and 12, is further improved, and there can be provided a device which has a wide detection zone of a uniform sensitivity distribution, attaining a large optical gain, and still can be made small in scale. Referring to FIG. 17, a mirror 22B of the circular scanning optical means has a reflecting surface which is concave to have a continuously changing curvature to the circular scanning direction, i.e., normal to an x—x' line direction, and to have a sufficiently small concave in the reflecting surface in the radial direction of the circular scanning with respect to the distance to the object surface, i.e., in the x—x' line direction, and is so formed that the center position of the concave surface is substantially in conformity to the visual field center FC, that is, as a whole, into a modification of so-called tropic mirror. The arrangement of the mirror 22B will be further detailed. When the reflecting surface 22Ba of the mirror 22B is directed toward the light receiving surface 11a of the infrared ray detector 11 and the mirror 22B is rotated about the visual field center FC as the rotary axis, the visual field F of the element 11 is circularly scanned. At this time, the concave surface of the mirror 22B in the radial directions of the circular scanning, i.e., in the x—x' line direction functions to expand the momentary visual field in the radial directions, while the concave surface of the mirror 22B in the direction normal to the x—x' line direction performs its condensing action in the scanning direction. Now assume that, as shown in FIG. 18, an incident ray coming from a point OS1 on the object surface is reflected at one end point M1 of the mirror 22B and then directed toward the light receiving surface 11a of the element 11, whereas an incident ray coming from another point OS2 on the object surface is reflected at the other end point M2 of the mirror 22B and then directed toward the light receiving surface 11a of the element 11. When the incident ray directed from the point OS1 to one end point M1 is vertical to the x axis, an angle $\theta$ of the incident ray from the point OS2 at the end point M2 with respect to the y axis denotes the momentary visual field angle in the radial directions. If the arcuate reflecting surface 22Ba has a curvature center N, the light receiving surface 11a is positioned right under the center of the reflecting surface, the point M1 has coordinates $(x_1, y_1)$, the point M2 has coordinates $(x_2, y_2)$ and the light receiving surface 11a has coordinates $(x_s, y_s)$ in an x-y coordinate system, then the mirror is set to satisfy relationships $x_2 = -x_1$, $x_s = 0$. Therefore, when the length of the section of the mirror 22B in the x-axis direction, the position of the light receiving surface 11a and the momentary visual field angle $\theta$ are suitably set, the curvature center N is determined and a circular scanning optical means having a large optical gain and minimized in size can be obtained.

Referring, in addition, to FIG. 19, Mt is a point on an arc of the reflecting surface 22Ba of the mirror 22B and at an angle "t" from a starting radius $\overline{NM1}$. When an incident ray coming from a point OSP on the object surface OS is reflected at the point Mt and directed toward the light receiving surface 11a, the distance Rb between the light receiving surface 11a and the point Mt on the reflecting surface 22Ba as well as the distance Ra between the point Mt and the point OSP on the object surface in a direction of a normal line nt at the point Mt are determined. The distance Rb satisfies a relationship $Rb = Rb(t)$ and varies depending on the position of the point Mt. In the illustrated embodiment, the concave surface of the mirror 22B in the scanning direction is arcuate. Thus, the incident light coming from the point OSP on the object surface can be condensed on the light receiving surface 11a by providing such a concave surface of the mirror 22B in the scanning direction as that providing a focus distance ft satisfying an equation $1/ft = (1/Ra) + (1/Rb)$ at the point M1 on the mirror 22B. In order to provide the focus distance ft, the concave surface is made so that the curvature radius Rt satisfies a relation $Rt = 2ft$ at the point Mt on the mirror 22B. Further, the concave surface is made so that the point Mt on the mirror 22B is in the middle of the scanning direction, the curvature center of the concave surface is located on an extension line of a segment $\overline{NMt}$ and a segment $\overline{NtMt}$ coincides with the curvature radius Rt.

It will be understood from the foregoing explanation that, since the curvature radius Rt meets a relation $Rt = \{(1/Ra) + (1/Rb(t))\}/2$ and $Rb(t)$ continuously varies, the curvature radius Rt also varies continuously correspondingly. Assuming that the object surface OS to be focused is parallel to a horizontal plane and R is a distance between the point Mt on the reflecting surface 22Ba of the mirror 22B and the object surface to be focused thereon, the distances R and Ra satisfy a relation $Ra = (R/\cos \theta_F) \cdot \cos \theta_M$ and thus the distance Ra also varies, where $\theta_M$ is an angle defined by a segment $\overline{MtS}$ and the normal Nt and $\theta_F$ is an angle defined by a segment $\overline{MtP}$ and the visual field center line FC. Accordingly, the curvature of the concave surface of the mirror 22B in the scanning direction is varied taking into consideration also the object surface OS to be focused.

FIG. 20 shows an example of particular dimensions of cross-sectional shape of the mirror 22B in the radiation direction, in which distances from the visual field center line FC to the end points M1 and M2 of the mirror are respectively 15 mm, a distance between the light receiving surface 11a and the end point M1 of the mirror in the direction of the visual field center line is 30 mm, the curvature radius of the concave surface is 28.5 mm, and an angle between the segment $\overline{NM1}$ and the horizontal plane at a point N is 76.7175°. Under such condition, incident light coming from a point OS2 on the object surface forms an angle of 71.6464° with the visual field center line FC, and the full visual field angle of the circular scanning optical means with respect to the object surface OS becomes 143.2928°. The thus formed mirror 22B condenses light from the object surface OS as shown in FIG. 21.

FIG. 22 shows a continuous variation in the curvature radius of the concave surface of the mirror 22B in the scanning direction, in which case the position of the reflecting surface 22Ba of the mirror 22B is represented in terms of the angle "t" between the segments NM1 and $\overline{NMt}$. As will be noted from the graph of FIG. 22, the curvature radii of the mirror 22B at the both end points M1 and M2 are 64.2108 mm and 45.4898 mm, respectively, and the width of the mirror 22B in the scanning direction is 30 mm.

When a circular scanning optical means including the mirror 22B having such a unique concave surface as mentioned in the foregoing is employed, such a curve 22BP as shown in FIG. 23 is obtained. That is, it will be appreciated that the incident light power of the present optical means regarding the horizontal distance is remarkably improved in relative value when compared with that of a circular scanning optical means including a later described mirror 22D having such a characteristic as shown by a curve 22BP' in FIG. 23. With such an arrangement as mentioned above, the rotary disc 21B carrying the mirror 22B can be set to have a diameter of 42.2 mm as shown in FIG. 24, whereas, with the use of the later described mirror 22D, the mirror must be set to be 20 mm long and 40 mm wide even when it is desired to obtain an incident light power corresponding nearly to the curve 22BP' in FIG. 23, which leads to the fact that a rotary disc 21B' on which such later described mirror is to be mounted must be at least 72.1 mm in diameter, as in FIG. 25. For this reason, the use of the mirror of FIG. 17 enables the realization of miniaturization of the scanning optical means.

Figure 26:
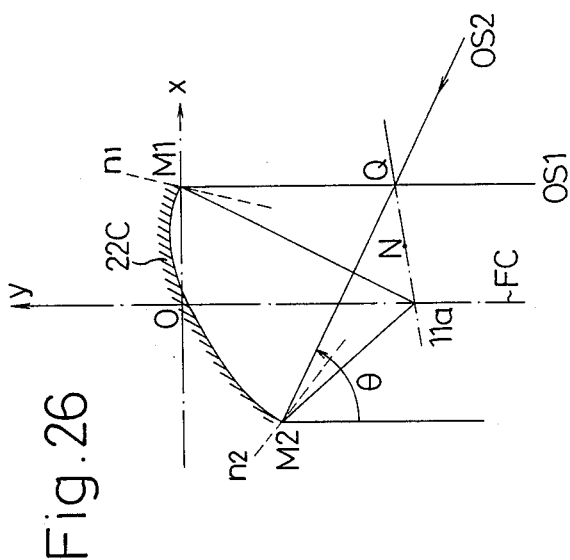

Shown in FIG. 26 is another embodiment of the circular scanning optical means, in which a mirror 22C having an elliptic shape in radial section is used to expand the momentary visual field angle in the radial direction. Assuming in FIG. 26 that the point M1 has coordinates $(x_1, y_1)$, the point M2 has coordinates $(x_2, y_2)$ and the light receiving surface 11a is positioned at coordinates $(x_s, y_s)$ in an x-y coordinate system, the mirror is set to satisfy relations $x_2 = -x_1$ and $x_s = 0$. That is, when the visual field center FC is placed in the center of the mirror 22C between the both end points M1 and M2 and the light receiving surface 11a of the infrared ray receiving element 11 is positioned on the visual field center line FC, the circular scanning optical means can be made small in size and provide a large optical gain. In this case, if normal vectors $n_1$ and $n_2$ at the end points M1 and M2 of the mirror 22C are taken into account and an incident ray directed from the point OS1 on the object surface toward the end point M1 intersects at a point Q an incident ray directed from the point OS2 on the object surface toward the end point M2, then the concave surface of the mirror 22C is made to be of an ellipse having the two focus points 11a and Q. When N is a middle point of a segment 11aQ connecting the points 11a and Q, the point N becomes the center of the above ellipse and the shape of the ellipse is determined by the length of the mirror 22C in the x-axis direction, the position of the light receiving surface 11a and the desired momentary visual field angle $\theta$.

Figure 27:
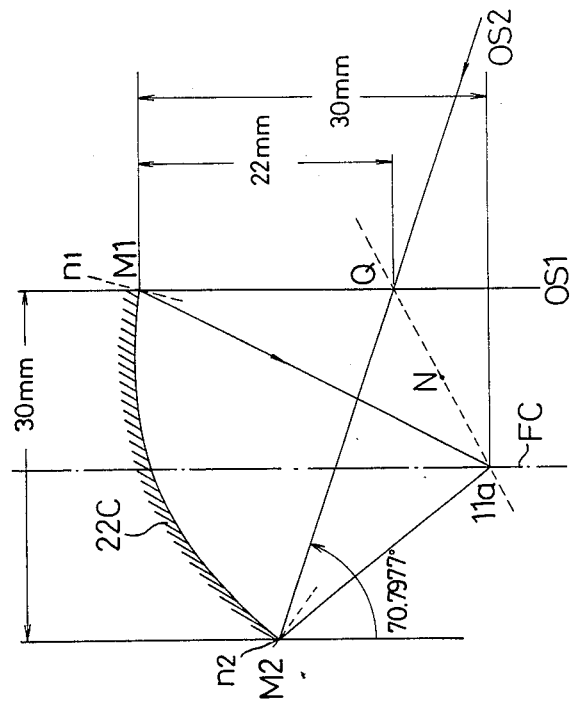
FIGS. 26 and 27 are diagrams for explaining another embodiment of the mirror employed in the person-number detecting system according to the present invention.
Figure 28:
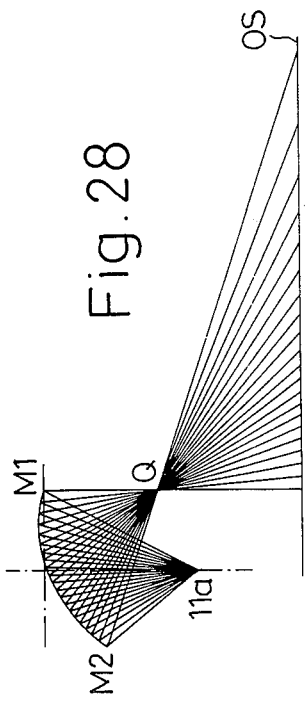
FIG. 28 is a diagram showing a condensing state of the mirror of FIGS. 26 and 27.
Figure 29:
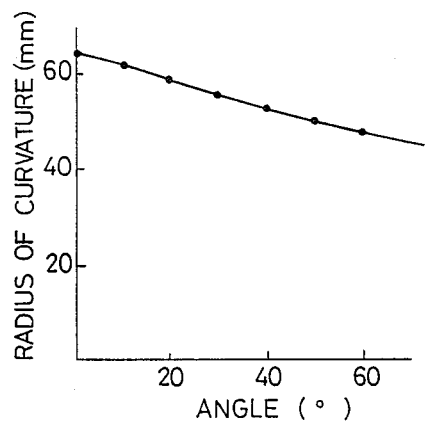
FIG. 29 is a graph showing a variation in the curvature radius of the mirror of FIGS. 26 and 27.

Shown in FIG. 27 is an example of particular dimensions of the sectional shape of the mirror 22C in the radial direction, in which horizontal distances between the visual field center line FC and the end points M1 and M2 of the mirror 22C are respectively 15 mm, a vertical distance between the light receiving surface 11a and the end point M1 is 30 mn, and the point Q is located at a position 20 mm right under the end point M1. Under such a condition, if an x axis set to be a straight line passing through the points 11a and Q and the center N of the elliptic shape is set to be an origin in an x-y coordinate system, the elliptic shape is expressed by $(x^2/a^2) + (y^2/b^2) = 1$, wherein a and b becomes 27.7705 mm and 26.4377 mm, respectively. And a given point $M(x,y)$ along the elliptic shape is expressed in terms of $x = a \cdot \cos \alpha$ and $y = b \cdot \cos \alpha$, where $\alpha$ is a parameter and becomes 47.2436° and 118.041° at the end points M1 and M2, respectively, and the full visual field angle for the object surface OS in the scanning optical means becomes 141.5954°. The condensing state of the mirror 22C is as shown in FIG. 28. Further, the concave surface of the mirror 22C in a direction normal to the radial direction is formed to have such a continuously varying curvature as providing a condensing action effective in the scanning direction, substantially in the same manner as in the mirror 22B shown in FIGS. 17 to 20 (refer to FIG. 29). The present mirror 22C also can realize the miniaturization and provide a high gain as in the mirror 22B shown in FIGS. 17 to 20.

In this way, when a circular scanning optical means comprising such a mirror as shown in FIGS. 17 to 20 and FIGS. 26 and 27 is employed, the full visual field angle covering the object surface will not be affected by the directional sensitivity characteristic of the infrared ray detector 11 and can be taken to be sufficiently large, and reduction in the sensitivity at a peripheral edge of the visual field FO can be prevented to provide a substantially uniform sensitivity all over the detection zone.

Figure 30:
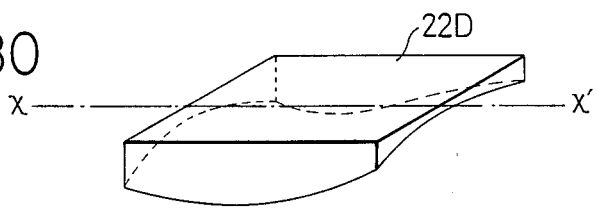
FIG. 30 is a perspective view of yet another embodiment of the mirror used in the person-number detecting system according to the present invention.
Figure 31:
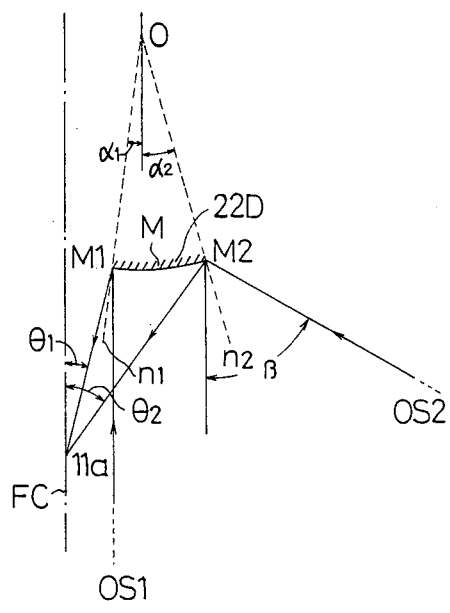
FIGS. 31, 32 and 33 are diagrams for explaining the operation of the mirror of FIG. 30.

Referring to FIG. 30, there is shown a mirror 22D which is more simplified than those of FIGS. 17 to 20 and FIGS. 26 and 27, and which still can provide an optical gain relatively uniform over a wider range than that of an ordinary cylindrical mirror. That is, the mirror 22D is formed to have a concave reflecting surface having a continuously varying curvature in the circularly scanning direction, i.e., in a direction normal to the x—x' axis and to have a convex surface in the x—x' axis direction. In this case, the provision of the convex surface in the mirror 22D enables expansion of the momentary visual field of the light receiving surface 11a of the infrared ray detector 11 in the radial direction while the provision of the concave surface in the mirror enables the condensing action of the mirror in the circularly scanning direction. Referring also to FIG. 31 in conjunction to FIG. 30, the mirror 22D is assumed to be that, when an incident ray coming from the point OS1 on the object surface is reflected at the end point M1 of the mirror 22D and directed toward the light receiving surface 11a, while an incident ray coming from the point OS2 on the subject surface is reflected at the other end point M2 on the mirror and directed toward the light receiving surface 11a. It is assumed further that the convex surface of the mirror 22D has a curvature center O and the normals $n_1$ and $n_2$ at the end points M1 and M2 form angles of $\alpha 1$ and $\alpha_2$ with the visual field center line FC of the light receiving surface 11a, i.e., with the rotary axis of the mirror 22D, respectively. If the incident rays directed toward the light receiving surface 11a from the end points M1 and M2 form angles of $\theta_1$ and $\theta_2$ with the visual field center line FC, respectively, and the incident ray coming from the point OS1 on the subject surface toward the end point M1 is parallel to the light receiving surface 11a, then an angle $\beta$ of the incident ray coming from the point OS2 on the subject surface toward the end point M2 with respect to the visual field center line corresponds to the momentary radial visual field angle of the light receiving surface 11a through the mirror 22D for the subject surface.

Under the above conditions, equations $\alpha_1 = \theta_1/2$, $\beta = 2\alpha_2 + \theta_2$ are satisfied, a visual field angle $(\theta_1 - \theta_2)$ of the light receiving surface 11a is increased in the radial direction through the mirror 22D in accordance with the visual field angle relative to the object surface. Further, when the visual field angle $(\theta_1 - \theta_2)$ doesn't become relatively large, the directional sensitivity characteristic of the light receiving surface 11a will not vary to a large extent during change of the angle with respect to the visual field center line FC from $\theta_1$ to $\theta_2$ and the detection zone can have a relatively uniform sensitivity distribution for the subject surface. When the normal $n_2$ at the end point M2, the angle $\alpha_2$ with respect to the visual field center line FC and the angles $\theta_1$ and $\theta_2$ of the light receiving surface 11a with respect to the field center line FC respectively at the end points M1 and M2 are suitably set, that is, when the curvature radius and center of the convex surface are suitably changed, the circular scanning optical means can have a desired visual field angle.

Figure 32:
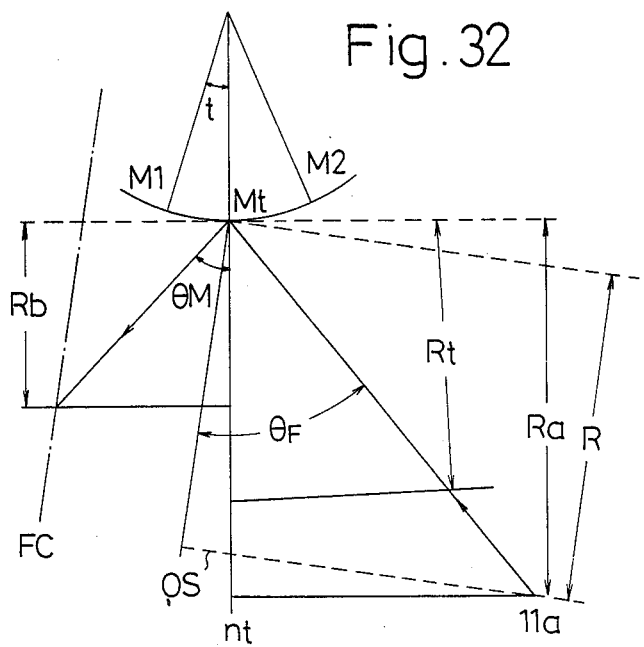

Referring to FIG. 32, the mirror 22D in FIG. 30 has the concave surface different in the focal distance at every position of the concave surface for providing the condensing action in the scanning direction, substantially in the same manner as the concave surface of the mirror 22B in FIG. 17.

Figure 33:
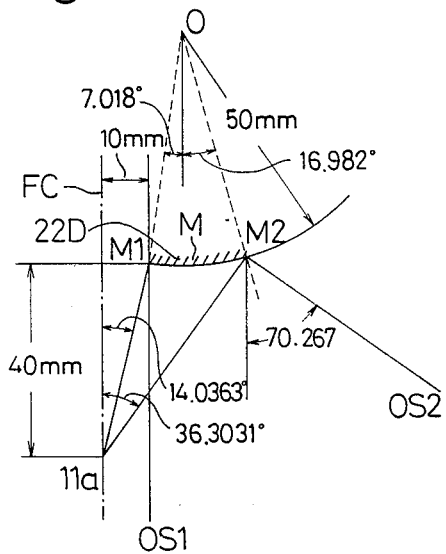

FIG. 33 shows an example of specific dimensions of the convex surface of the mirror 22D, in which a distance from the visual field center line FC to the end point M1 is 10 mm, a distance from the light receiving surface 11a to the end point M1 along the field center line is 40 mm, the curvature radius of the convex surface is 50 mm, $\alpha_1 = 7.018°$, $\alpha_2 = 16.982°$, the angles $\theta_1$ and $\theta_2$ of the end points M1 and M2 with the visual field center line FC are 14.0363° and 36.3031°, respectively, the depth angle $\beta$ for the object surface is 70.267°, and full visual field angle is 140.534°.

Figure 34:
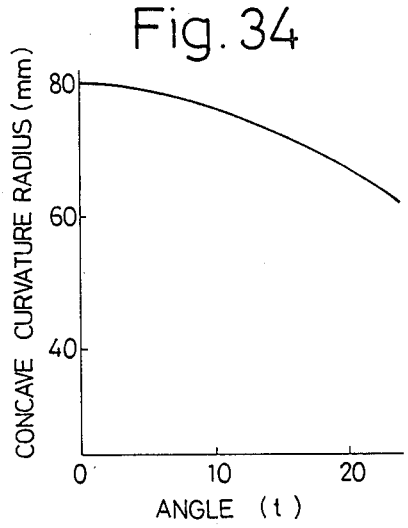
FIGS. 34 and 35 are graphs showing characteristics of the mirror of FIG. 30.
Figure 35:
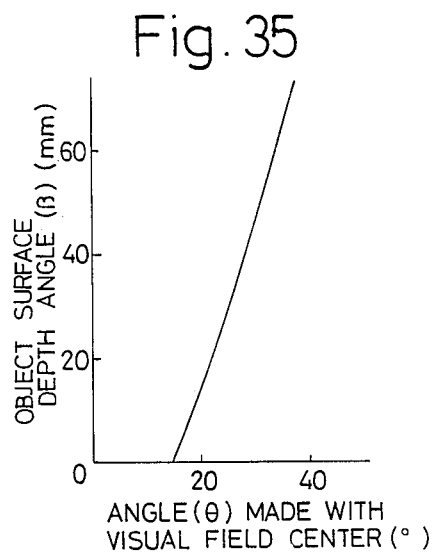

Further, in specific dimensions of the concave surface of the mirror 22D, as seen from a curve expressed in terms of the angle t of the curvature center O of the convex surface with the end point M1 in FIG. 34, the curvature radii at the end points M1 and M2 are 80.1911 mm and 61.4864 mm, respectively. FIG. 35 shows a relationship between the angle $\theta$ of the light receiving surface 11a having the above specific dimensions with respect to the visual field center line FC and the object surface depth angle $\beta$ through the mirror.

According to another feature of the present invention, there is provided such a system that a circular scanning optical means is arranged to gradually increase an optical gain as it goes away from the visual field center line FC, whereby infrared ray power from the peripheral part on the object surface is increased and a uniform sensitivity can be achieved all over a wide detection zone. That is, referring to FIG. 36, a mirror 22E in the present embodiment is formed to have a reflecting part 22Ea closest to the visual field center line FC, which part 22Ea is formed to be convex in a plane including the rotary axis of a rotary disc 21E, i.e., including the visual field center line FC to detect infrared rays coming from a visual field angle zone of the infrared ray detector 11 ranging from 0 to $\theta_1$, that is, from a visual field Fa. An intermediate reflecting part 22Eb of the mirror 22E is formed to be slightly convex or concave or flat in a plane including the visual field center line FC to detect infrared rays coming from a visual field angle zone of the infrared ray detector 11 ranging from $\theta_1$ to $\theta_2$, i.e., from a visual field Fb. A reflecting part 22Ec of the mirror 22E farthest from the visual field center line FC is formed to be concave in a plane including the visual field center line FC and to detect infrared rays coming from a visual field angle zone of the detector 11 ranging from $\theta_2$ to $\theta_3$, i.e., from a visual field FC. In other words, the mirror 22E has a negative reflecting action on a side close to the visual field center line and a positive reflecting action on a side far from the field center line. The mirror 22E is also arranged to have a concave surface in the scanning direction as in the mirror of FIGS. 17 and 30.

Through the foregoing mirror 22E has been referred to as an example of such an arrangement that its reflecting surface varies in a three stage form, but actually the reflecting surface is desirably continuously varied to provide a constant detection power to the detector 11 without any limitation by the visual field angle, taking into consideration the visual field angle of the infrared ray power from the object surface.

In a circular scanning optical means of FIGS. 37 and 38, the mirror of FIG. 36 is replaced by Fresnel lenses to provide a similar action to that of FIG. 36. That is, mounted in an opening made in a rotary disc 21F are lenses 22Fa, 22Fb and 22Fc which respectively have negative, zero and positive lens effects sequentially from the side near to the visual field center line FC and which also have respectively a positive lens effect in the scanning direction.

In an event where the circular scanning optical means of FIG. 36 or FIGS. 37 and 38 are employed, it will be seen that the optical gain and detection power are respectively represented by curves 22FG and 22FP in FIG. 39, which are remarkably improved when compared, for example, with the optical gain 22G and detection power 22P of the arrangement of FIG. 11 or the optical gain 22G' and detection power 22P' in the case of a cylindrical mirror made to have an opening the width Dm of which is gradually reduced from the periphery to the center of the disc.

Figure 41:
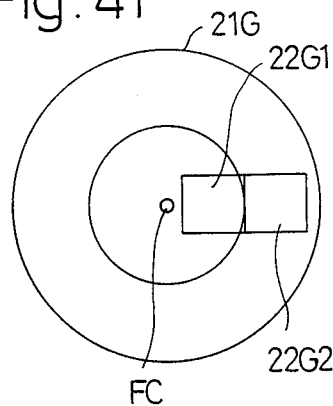
FIG. 41 is a bottom view of a major part of the optical means of FIG. 40.
Figure 40:
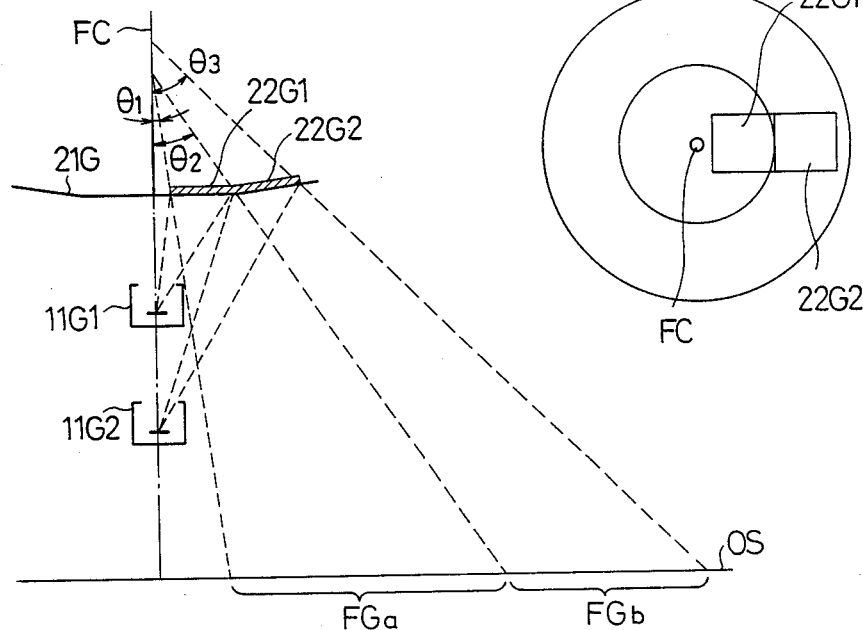
FIG. 40 is a diagram for explaining another embodiment of the circular scanning optical means used in the person-number detecting system according to the present invention.

According to another feature of the present invention, there is provided such an arrangement that enhances its resolution in the radial direction to increase its person number measuring accuracy. Referring to FIGS. 40 and 41, cylindrical mirrors 22G1 and 22G2 are provided on a rotary disc 21G to be radially continuous with respect to the visual field center line FC, and infrared ray detectors 11G1 and 11G2 for receiving rays inflected by th respective mirrors 22G1 and 22G2 are arranged on the visual field center line FC. With such an arrangement, the elements 11G1 and 11G2, which have visual fields FGa and FGb through the mirrors 22G1 and 22G2 respectively, have visual field angles $(\theta_1 \sim \theta_2)$ and $(\theta_2 \sim \theta_3)$, respectively, during rotation of the disc 21G, whereby the resolution in the radial direction on the object surface OS can be enhanced. In the present instance, further, the rotary disc 21G is provided so that a mounting surface of the disc for the radially outer mirror 22G2 is slight angled with respect to mounting surface of the disc for the radially inner mirror 22G. With this arrangement, it will be understood that the radial resolution can be further enhanced by properly increasing in the number the mirrors and detectors.

Figure 42:
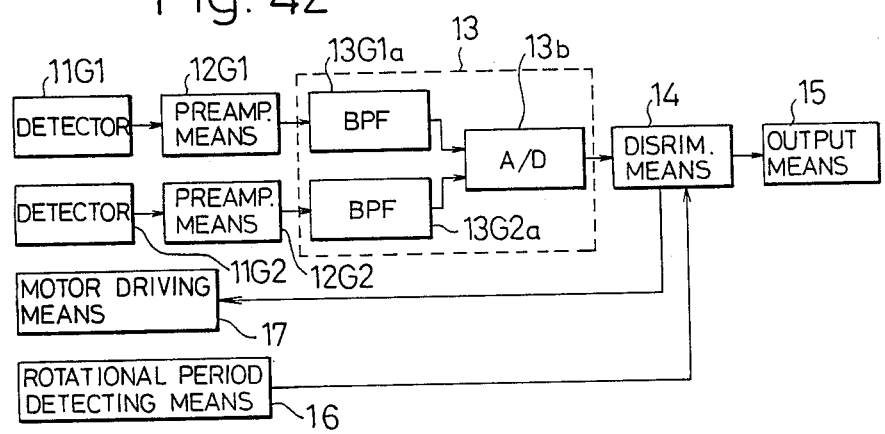
FIG. 42 is a block diagram of another embodiment of the person-number detecting system employing the optical means of FIG. 40 according to the present invention.

In the person-number detecting system employing such optical means as shown in FIGS. 40 and 41, preamplifiers 12G1 and 12G2 as well as band pass filters 13G1a and 13G2a of the signal processing means 13 are added, as shown in FIG. 42. Other arrangement, operation and action of the system of FIG. 42 are substantially the same as those of the person-number detecting system of FIG. 13.

Figure 43:
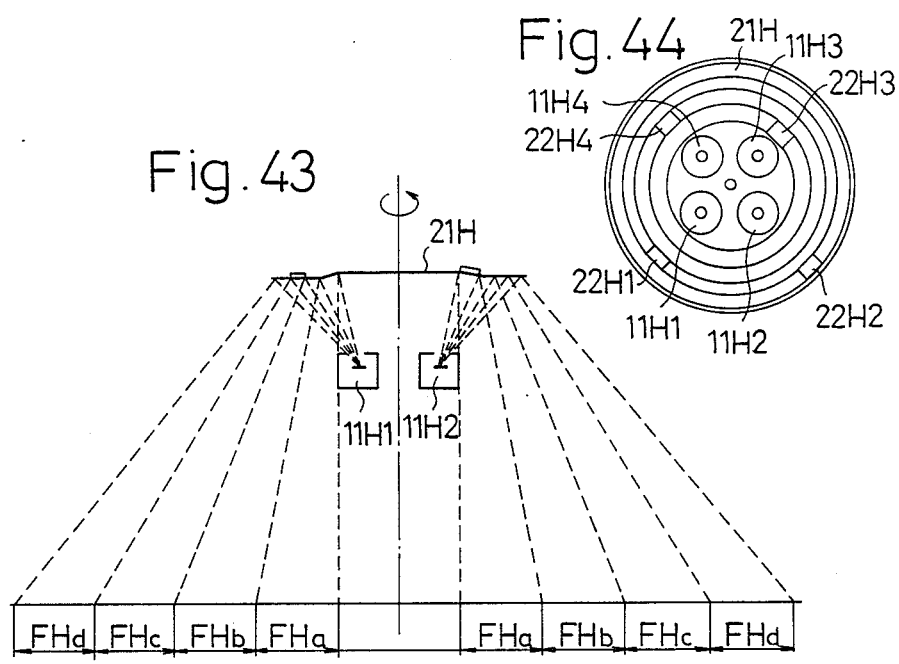
FIG. 43 is a diagram for explaining another embodiment of the circular scanning optical means used in the person-number detecting system according to the present invention.
Figure 44:
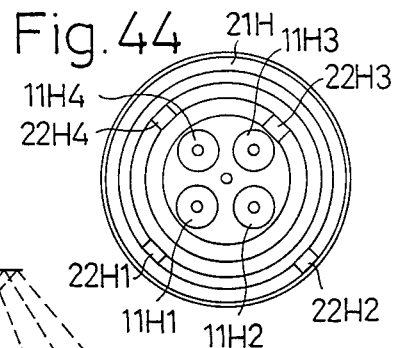
FIG. 44 is a bottom view of a major part of the optical means of FIG. 43.
Figure 45:
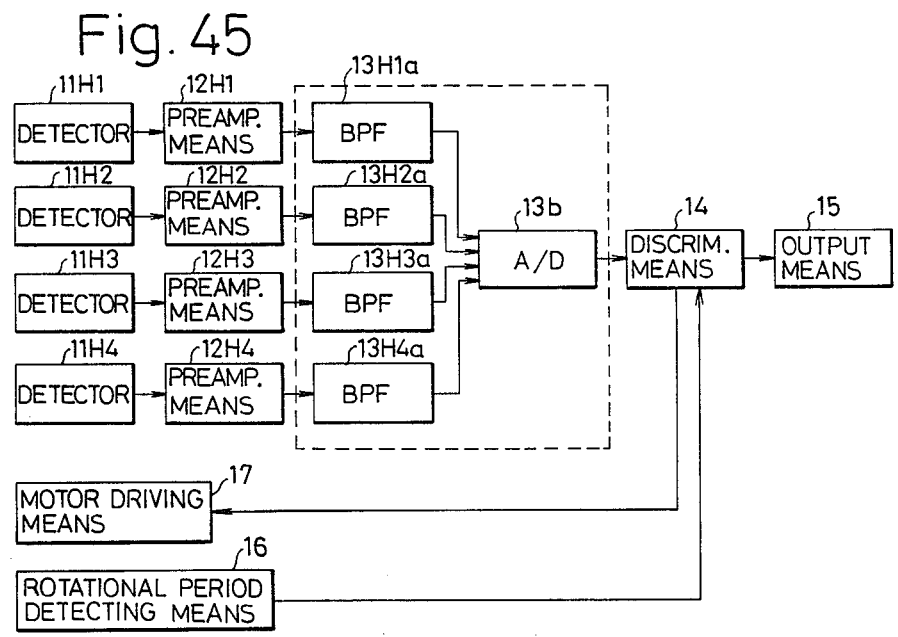
FIG. 45 is a diagram for explaining yet another embodiment of the person-number detecting system employing the optical means of FIG. 43 according to the present invention.

There is shown in FIGS. 43 and 44 another embodiment suggested for improving resolution, in which cylindrical mirrors 22H1 through 22H4 are provided to a rotary disc 21H at circumferential intervals of a rotational angle of 90 degrees, while infrared ray detectors 11H1 through 11H4 having visual field center lines not coinciding with the rotary axis of the rotary disc are arranged so that the visual field center lines of the detectors are parallel to each other and are spaced circumferentially from each other by 90 degrees with respect to the rotary axis of the disc. Such an arrangement can provide four annular visual fields FHa to FHd. When such optical means is employed, the person-number detecting system includes four preamplifiers 12H1 to 12H4 and four band pass filters 13H1a to 13H4a as shown in FIG. 45. Other arrangement and operation of the system of FIG. 45 are substantially the same as those of the system of FIG. 13.

According to another feature of the present invention, there is provided such an arrangement that prevents the vicinity of the rotary axis of the optical means from becoming a blind zone during the circular scanning operation. Referring to FIGS. 46 and 47, a person-number detecting system 30 is housed in a casing 31 fixedly mounted to a wall and having a transparent lower part for passing detection light therethrough, and comprises a rotary scanning optical means 10 including a cylindrical mirror or lens or a mirror 22I similar to that in FIGS. 17 or 30, which mirror is mounted on a rotary disc to be rotated by a motor of a motor driving means 17. In the illustrated embodiment, the optical means 10 and detector 11 are disposed in the casing 31 so that the rotary axis of the optical means, i.e., the visual field center line FC of the infrared ray detector is oblique with respect to the wall surface. The inclined angle $\theta_I$ is set so that a point O at which the visual field center line FC intersects the floor FL is positioned inside the wall, whereby an incident ray toward the end point M1 of the mirror 22I can be obtained from an intersection point FS1 between the wall and the floor FL and a visual field FO can be formed between the incident ray toward the end point M1 and the incident ray from another point FS2 on the floor toward the end point M2. As a result, the blind zone of the optical means 10 can be eliminated.

It will be seen from FIG. 47 that, in an event where a visual field is expanded with use of, in particular, such a unique mirror as in the foregoing embodiment, a detection zone DAO of the system is formed between FI1 and FI2 and the blind zone is within the wall, thus allowing setting of a necessary detection zone NA nearby the wall; whereas, if a person-number detecting system including an ordinary cylindrical mirror is mounted on the wall in a known manner, then a detection zone DA′ of the ordinary system is formed between FI1′ and FI2′ and a zone IMA (denoted by many dots) within the necessary detection zone becomes a blind zone. In this way, according to the present invention, the reliability of the system is improved to a large extent. The above angle $\theta$ is set to be preferably between about 10 and 20 degrees when the mounting height of the system 30 is between 2.5 and 3.5 m.

The aforementioned system 10 is mounted preferably, as shown in FIG. 48, in a mounting bracket 33 of an E shaped section which in turn is secured by screws to a base 32 fixed to the wall. In the illustrated embodiment, leg parts of the bracket 33 are inclined downwards in a direction of leaving the wall, an upper piece 33a of the bracket carries thereon a motor driving means 17 including a motor, and a lower piece 33b of the bracket is provided with the infrared ray detector 11. Further, the mirror 22I is attached onto a lower side of the rotary disc 21I mounted on an output shaft of the motor driving means 17.

According to another feature of the present invention, there is provided such an arrangement that a visual field is switched between a near-distance field and a far-distance field at intervals of half a period of the circular scanning and a single infrared ray detector is used to improve its person-number detection accuracy. That is, referring to FIGS. 49 to 52, the circular scanning optical means 10 in the present embodiment receives an output of a microcomputer of the discrimination means 14 which in turn receives an output of a synchronous signal generating means 16, so that a rotary disc 21J in the means 10 is provided to rotate or stop as required, and the disc 21J can be rotated intermittently. Attached to the rotary disc 21J driven by the motor driving means 17 are such mirrors 22J1 and 22J2 as shown in FIG. 18 or FIG. 30, so that the mirrors are mutually spaced by a rotational angle of 180 degrees and one of the mirrors is positioned on the side of the rotary axis, i.e., the visual field center FC while the other is positioned on the side of the periphery of the rotary disc. With such an arrangement, one mirror 22J1 provides a near-distance field FJ1 while the other mirror 22J2 provides a far-distance field FJ2. When the system is mounted to the wall, the mirrors 22J1 and 22J2 alternately come into the detection zone.

Figure 53:
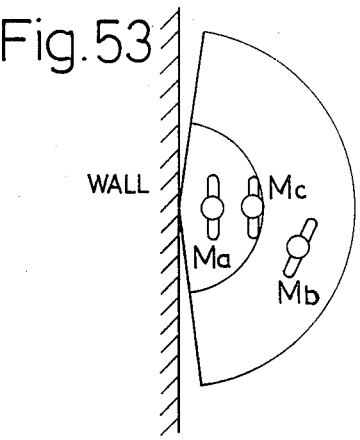
Figure 54:
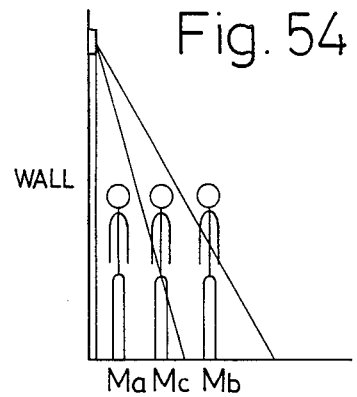
Figure 55:
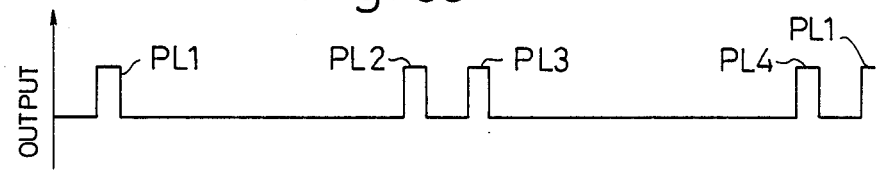
FIGS. 55 to 57 show output waveforms of the system of FIG. 49 for explaining the operation of the system.

Now assume that, as shown in FIGS. 53 and 54, three persons Ma, Mb and Mc are present sequentially from the wall in the detection zone of the system. The circular scanning optical means 10 is operated, fo example, in the same procedure as for the embodiment of FIG. 13. At this time, the synchronous signal generating means 16 which is monitoring the operation of the motor driving means 17 for driving the rotary disc 21J of the means 10 generates such pulses PL1 to PL4 as shown in FIG. 55, in which the pulse PL1 is generated immediately when the momentary visual field of the mirror 22J1 enters the detection zone, the pulse PL2 indicates that the visual field of this mirror 22J1 gets out of the detection zone, and the pulses PL3 and PL4 are generated when the mirror 22J2 enters and gets out of the detection zone, respectively. In the illustrated embodiment, the arrangement is so set that, when the pulses PL2 and PL4 are provided, the rotary disc 21J is stopped and the respective outputs of the far-distance and near-distance fields are obtained from the detector 11 positively independently of each other.

Figure 56:
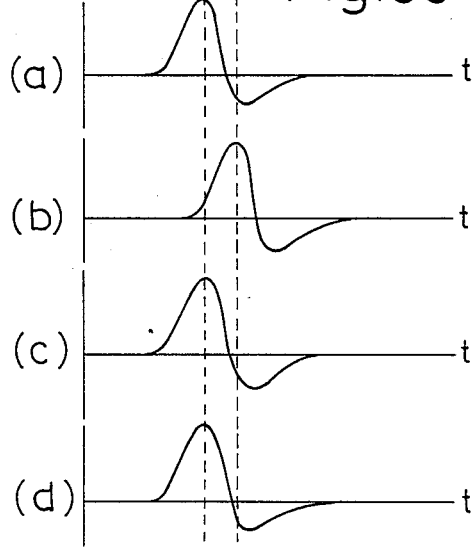
Figure 57:
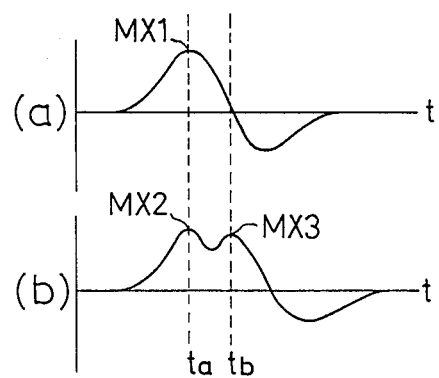

A detection signal detected by the infrared ray detector 11 is sent to and processed at the discrimination means 14 in the procedure mentioned in connection with the embodiment of FIG. 13. In an event of the presence of persons Ma and Mb, the computer in the discrimination means 14 receives such near-distance and far-distance side comparison waveform data as shown in FIGS. 56(a) and (b), respectively. Further, upon presence of the person Mc, such near-distance and far-distance side comparison waveform data as shown in FIGS. 56(c) and (d), respectively, are received as inputs. The waveform data shown in FIGS. 56(a) and (b) are different in the timing of reaching the maximum value, while the waveform data shown in FIGS. 56(c) and (d) are the same in the timing of the maximum value. When a sum of the numbers of maximum values of the near-distance and far-distance data is subtracted from one of the numbers of the maximum values of the near-distance and far-distance data taking place at the same time, the number of persons present in the detection zone will be detected. Upon presence of the persons Mb and Mc, for example, the near-distance data will be a single maximum value MX1 as shown in FIG. 57(a) and the far-distance data will be two maximum values MX2 and MX3 as shown in FIG. 57(b) and, since the maximum values MX1 and MX2 of the FIGS. 57(a) and (b) are taking place simultaneously at a timing ta, the situation is $2+1-1=2$, that is, the number of person is found to be two.

Figure 58:
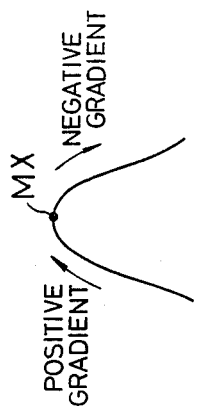
FIG. 58 is a circuit diagram of an amplifying means used in the person-number detecting system according to the present invention.
Figure 59:
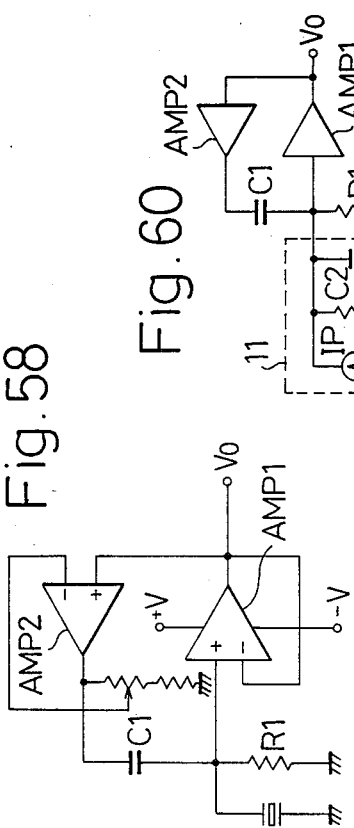
FIG. 59 is a graph showing a characteristic of the amplifier of FIG. 58 together with a characteristic of a prior art for comparison.
Figure 62:
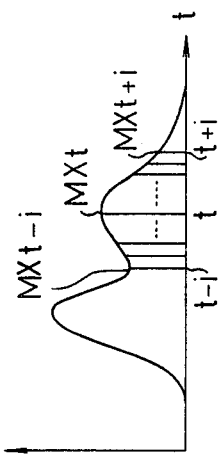
FIG. 62 is a diagram for explaining the operation of another embodiment of the person-number detecting system according to the present invention.

According to another feature of the present invention, a preamplifier is provided to improve the reliability of the person-number detecting system with a large gain, a good high-frequency response characteristic and a high speed response. Referring to FIG. 58, the preamplifier comprises a resistor R1 which receives a current from such an infrared ray detector 11 as a pyroelectric element that produces an output current $I_P$ in response to a variation in the incident energy and converts the current to a voltage, an operational amplifier AMP1 of a preferably FET input type which performs the impedance conversion and amplification of the voltage signal received from the resistor R1, and a positive feedback circuit including another operational amplifier AMP2 and a capacitor C1 with respect to the operational amplifier AMP1, the amplifier AMP2 of the positive feedback circuit being provided to be adjustable in its gain by a variable resistor $V_R$. Since the preamplifier comprises the positive feedback circuit, it can provide improved high-frequency characteristics as shown by a dotted-line curve in FIG. 59, as well as a high speed response when compared with such characteristics of known preamplifier shown by a solid line curve in FIG. 59.

Figure 60:
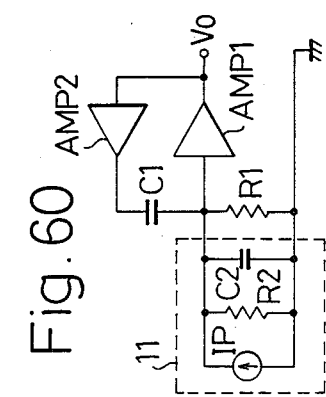
FIGS. 60 and 61 are equivalent circuits of the amplifier of FIG. 58, respectively.
Figure 61:
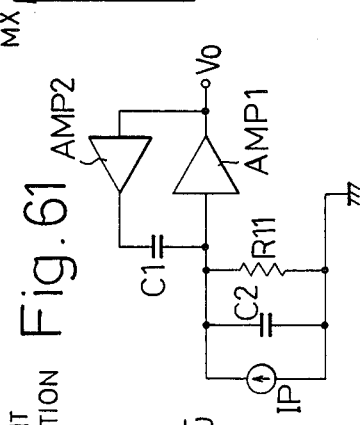

More in detail, the circuit of FIG. 58 is expressed by an equivalent circuit of FIG. 60, in which the pyroelectric element as the infrared ray detector is shown as made up of the current generator $I_P$ based on pyroelectric effect, an internal high resistor R2 of the element and a capacitor C2. The equivalent circuit of FIG. 60 is also expressed by an equivalent circuit of FIG. 61, when a parallel circuit of the internal high resistor R2 of the pyroelectric element and the resistor R1 for voltage conversion is replaced by R11(=R2/R1). Supposing that the operational amplifiers AMP1 and AMP2 have gains $G_1$ and $G_2$, respectively, and the current generator produces an output current $I_P$. Then an output voltage Vo of the preamplifier is given by:

$$Vo = R11 \cdot G_1 \cdot I_P / \{1 + j\omega R11(C1 + C2 - G_2 \cdot C1)\}$$

$$Vo/I_P = R11 \cdot G_1 / \{1 + j\omega R11(C1 + C2 - G_2 \cdot C1)\}$$

When the gain $G_2$ of the operational amplifier AMP2 is adjusted to be C2/C1, the above equation $Vo/I_P$ is expressed by $Vo/I_P = R11 G_1$, that is, the relationship between the output voltage Vo of the operational amplifier AMP1 and the output current $I_P$ of the pyroelectric element 11 becomes constant independently of frequency, thus ensuring the high speed response characteristics.

Referring to FIGS. 62 to 68, the person-number detecting system of the present invention has a more detailed arrangement for providing accurate person-number information on the basis of the maximum points in the detection signal. As a basic matter, the maximum point in the detection signal is characterized by the fact that the detection signal waveform is reversed in its gradient before and after the maximum point, and thus it is suitable to detect, as the maximum point, a point when reversed in its gradient polarity before and after the point.

As has been partly explained in the foregoing, the microcomputer of the discrimination means, which stores a reference waveform (refer to RW in FIG. 63) preferably each time when it receives an input signal, performs, upon receiving a new input waveform (refer to IW in FIG. 64), a comparison operation between the reference waveform and the new input waveform to prepare a compared waveform (refer to CPW in FIG. 65). In the compared waveform, a part of the waveform corresponding to the absence of any person has substantially zero voltage level while a part corresponding to the presence of a person has a convex shape. The convex waveform part has one maximum point and positive and negative gradients on both sides thereof. FIG. 66 shows a waveform having such parts with the gradients before and after the maximum point being exaggerated. When a part of the waveform ranging from a point having a gradient larger than a predetermined positive gradient to a point having a gradient smaller than a predetermined negative gradient is detected as having the maximum point in the part, person-number information can be extracted.

Figure 67:
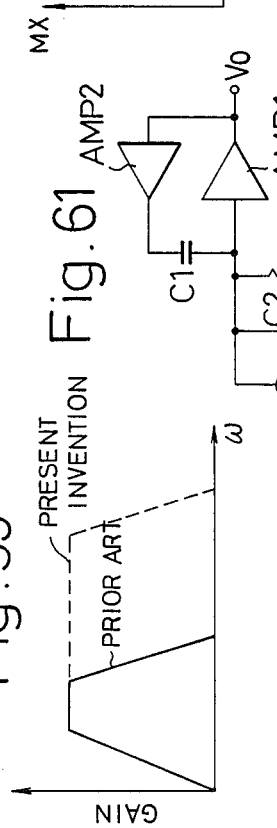
FIGS. 67 and 68 are graphs for explaining the operation of other embodiments of the person-number detecting system according to the present invention.

In addition, in an event where the system receives such an input waveform containing maximum points with time as shown in FIG. 67, a filter for substitution of (2i+1) intradata maximum values at a timing t between both timings (t−i) and (t+i) in the input waveform is used as an intrasection maximum value substitution filter, whereas a filter for substitution of (2i+1) intradata minimum values at the timing t between the timings (t−i) and (t+i) is used as an intrasection minimum value substitution filter.

Figure 69:
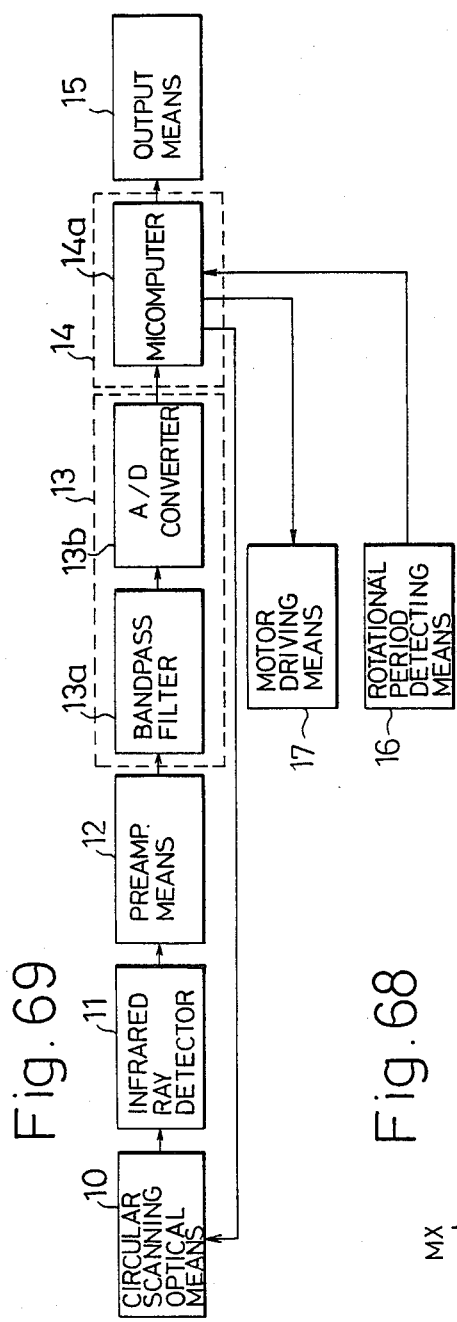
FIG. 69 is a block diagram of another embodiment of the person-number detecting system according to the present invention.
Figure 68:
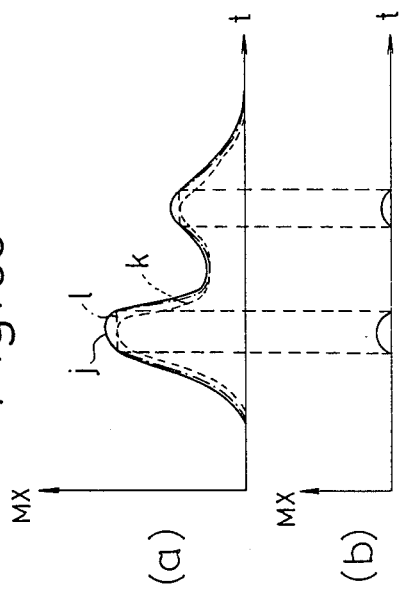
Figure 70:
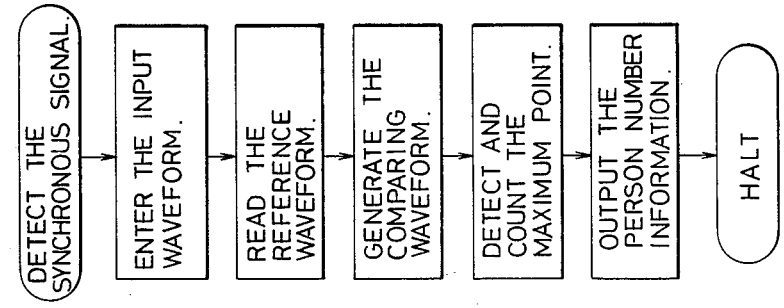
FIG. 70 is a flowchart for explaining the operation of the system of FIG. 69.

If the compared waveform is as shown in FIG. 68, then the whole waveform is first subjected to an action of the intrasection minimum value substitution filter, so that such a waveform j as shown by a solid line curve is converted to such a waveform k as shown by a dotted line curve. When the converted waveform j is then subjected to an action of the intrasection maximum value substitution filter, the waveform j is converted to such a waveform 1 as shown by a chain line curve. In addition, subtraction of the solid line waveform j from the chain line waveform 1 produces such a waveform that has positive values only in the vicinity of the maximum point and zero value in the other part. Thus, the maximum points will be easily detected and counted from the subtraction waveform. The above operation and maximum value counting is executed with use of a circuit of FIG. 69 in the similar manner to that in FIGS. 1 to 13 and preferably in accordance with a flowchart of FIG. 70.

Figure 71:
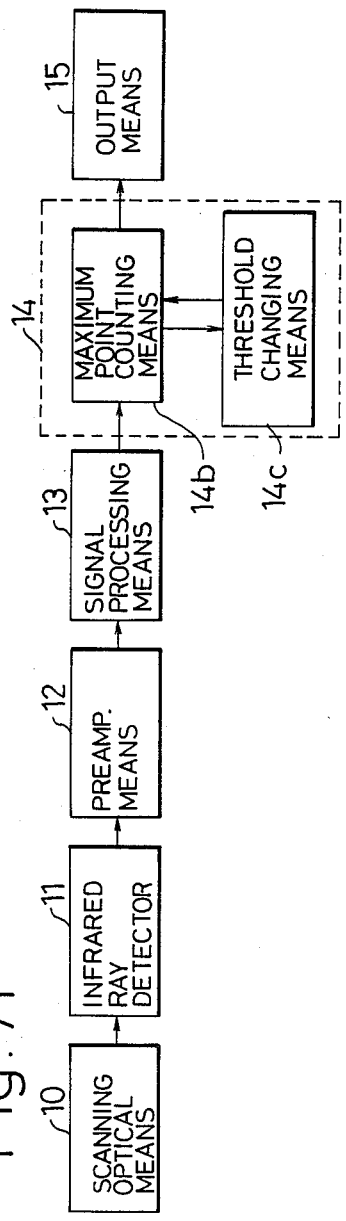
FIG. 71 is a block diagram of another embodiment of the person-number detecting system according to the present invention.

In detecting the maximum points, further, such a person-number detecting system as shown in FIG. 71 can be effectively employed. In the system, the discrimination means 14 includes a maximum point counting means 14b and a threshold value changing means 14c. In this case, the maximum counting means 14b functions to count the number of maximum points having values higher than a predetermined threshold value, while the threshold changing means 14c functions to reduce the above threshold value when the counting means 14b detects a maximum point. Other arrangement and operation of the system are substantially the same as those of the system of FIGS. 1, 13 or 69.

The operation of the discrimination means 14 of the present system is carried out in accordance with a flowchart of FIG. 72. More in detail, a predetermined number of data per period of the circular scanning optical means 10 are entered at intervals of an equal angle through an A/D converter of the signal processing means 13 into the discrimination means 14 where the microcomputer stores the data in its input buffer. On the other hand, the microcomputer is subjected to an interruption by a synchronous signal received from a synchronous signal generating means and receives the input waveform IW previously stored in the input buffer only by an amount corresponding to one period (i=1, 2, . . . , n) of the circular scanning operation. The microcomputer has previously stored in its memory the previous input waveform as the reference waveform RW, this reference waveform is called, and any differential between the reference waveform and the input waveform IW is determined to form a compared waveform cpw. Further, a gradient waveform $DW(=CPW_t - CPW_{t-\omega})$ is calculated, where $\omega$ is a small positive integer.

Figure 73:
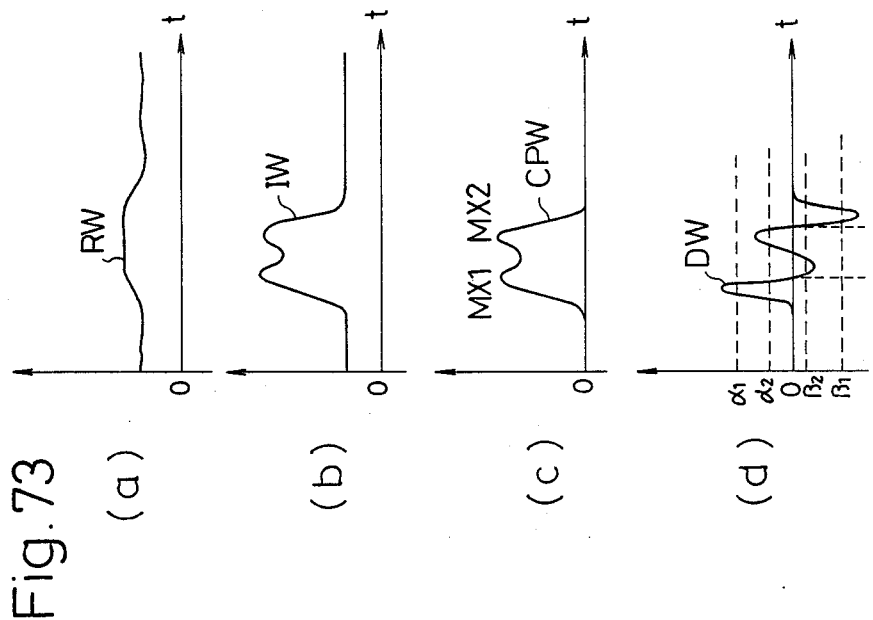
FIG. 73 shows waveforms of signals for explaining the operation of the system of FIG. 71.

Referring to FIG. 73, there are sequentially shown the reference, input and compared waveforms RW, IW and CPW together with the gradient waveform DW, when the system detects, for example, two persons side by side. In this case, since the detection input is continuous, two maximum points MX1 and MX2 of the compared waveform CPW are closer and thus the gradient of the part of the waveform CPW between the both points MX1 and MX2 may not reach a threshold value $\beta_1$ or $\alpha_1$ in some applications. In order to avoid such situation, the present system comprises the threshold value changing means 14c which functions to change it to a threshold value $\alpha_2$ or $\beta_2$ having a small absolute value, when the gradient of the first maximum point MX1 reaches the threshold value $\alpha_1$. The system correspondingly detects a pair of points reaching the threshold values $\alpha_2$ and $\beta_2$ respectively having positive and negative gradients, and discriminates the number of maximum points, i.e., of persons on the basis of the detected pair. After this, if the compared waveform CPW reaches substantially zero level, then the threshold changing means 14c returns the thresholds again to the initial threshold values $\alpha_1$ and $\beta_1$.

An operation change-over flag F is used for changing the above threshold value, and more particularly for switching between a first operation for searching of a point reaching the threshold value $\alpha_1$ of a positive gradient, a second operation for searching of a point reaching the threshold value $\beta_2$ of a negative gradient, and a third operation for searching of a point reaching the threshold value $\alpha_2$ of a positive gradient. As seen from FIG. 72, when the flag F has a value of 1, the first operation is carried out to search for a point of the gradient waveform DW having a value higher than the threshold value $\alpha_l$ of a positive gradient in a range from $i=1+w$ to $i=n$. When a point satisfying a relationship $DW \geq \alpha_1$ is detected, the value of F is changed to be 2. When the value F is 2, the second operation is carried out to search for a point of the gradient waveform DW having a value smaller than the negative threshold value $\beta_2$ in a range up to $i=n$. When a point satisfying a relationship $DW \leq \beta_2$ is detected, the value of the flag F is changed to be 3 and a variable N as a person-number count is subjected to an increment by $+1$. This is because, when the gradient waveform DW exceeds the threshold value $\alpha_1$ and thereafter reaches below the threshold value $\beta_2$ of a negative gradient, a point of the waveform having a gradient of zero between the values $\alpha_1$ and $\beta_2$ is considered to be the maximum point corresponding to person. When the flag F has a value of 3, the third operation is performed to search for a point of the gradient waveform DW having a value higher than the threshold value $\alpha_2$ of a positive gradient in a range up to $i=n$. When a point satisfying a relationship $DW \geq \alpha_2$ is detected, the value of the flag F is changed to be 2 and the operation is returned to the above operation for searching for a point satisfying the relationship $DW \leq \beta_2$. When a point satisfying the relationship $DW \geq \beta_2$ cannot be detected, a point satisfying the relationship $DW \leq \beta_1$ is searched for. When a point meeting the relationship $DW \leq \beta_1$ is detected, the compared waveform CPW reaches its abruptly rising part and thus the waveform CPW after the abruptly rising part is considered to converge to zero level, so that the value of the flag F is set to be 1, returning to the initial state. Thereafter, the maximum point detection based on the threshold values $\alpha_2$ and $\beta_2$ is carried out until a point satisfying the relationship $DW \geq \alpha_1$ is detected, in which case, in order to confirm the convergence of the compared waveform CPW to zero level, it may be first detected that the absolute value of the waveform CPW has been substantially at zero level during a predetermined period of time and then the value of the flag F may be set to be 1.

The changing operation of the threshold value will be detailed. In a rising part of the compared waveform CPW reaching the first maximum point MX1, the gradient waveform DW has an abrupt positive gradient exceeding the threshold value $\alpha_1$ of a positive gradient, which results in that the value of the flag F is changed from 1 to 2. In a part of the waveform CPW gradually falling from the maximum point MX1, the gradient waveform DW has a gradient not reaching the threshold value $\beta_1$ of a negative gradient but reaching the threshold value $\beta_2$ smaller in absolute value than the value $\beta_1$, so that the value of the flag F is changed from 2 to 3 and the variable N as a person-number count is subjected to an increment from 0 to 1. Next, in a part of the waveform CPW gradually rising to the next maximum point MX2, the gradient waveform DW does not reach the threshold value $\alpha_1$ of a positive gradient but reaches the threshold value $\alpha_2$ smaller in absolute value than the value $\alpha_1$, so that the value of the flag F is changed from 3 to 2. In a part of the waveform CPW abruptly falling from the maximum point MX2, the gradient waveform DW reaches the threshold value $\beta_2$ of a negative gradient and subsequently reaches the threshold value $\beta_1$ larger in absolute value than the value $\beta_2$. Therefore, at a moment when the relationship $CPW \leq \beta_2$ is satisfied, the value of the flag F is switched from 2 to 3 and the variable N as a person-number count is increased from 1 to 2. At a moment when the relationship $CPW \leq \beta_1$ is satisfied, the value of the flag F is changed from 3 to 1, returning to the initial state. The above operation causes the person-number count variable N to be 2, that is, two persons corresponding to the maximum points MX1 and MX2 to be accurately counted. Other arrangement and operation of the system of the present embodiment are substantially the same as those of the system of FIGS. 1 or 13.

In the present invention, as has been explained in the foregoing, each time when the discrimination means 14 receives a new input waveform, the reference waveform in the discrimination means 14 is renewed always by the new input waveform. However, in an event where not whole but only part of a waveform corresponding to a person appears in a transitory period from one circular scanning period to the next period, it becomes impossible to detect the person, unless the whole waveform appears. On the other hand, the new input waveform becomes a reference waveform for the next scanning period, and it is considered possible that a reference waveform having a background temperature distribution different from desired one is undesirably stored. According to another feature of the present invention, there is provided an arrangement that only a desired reference waveform is always stored.

Figure 74:
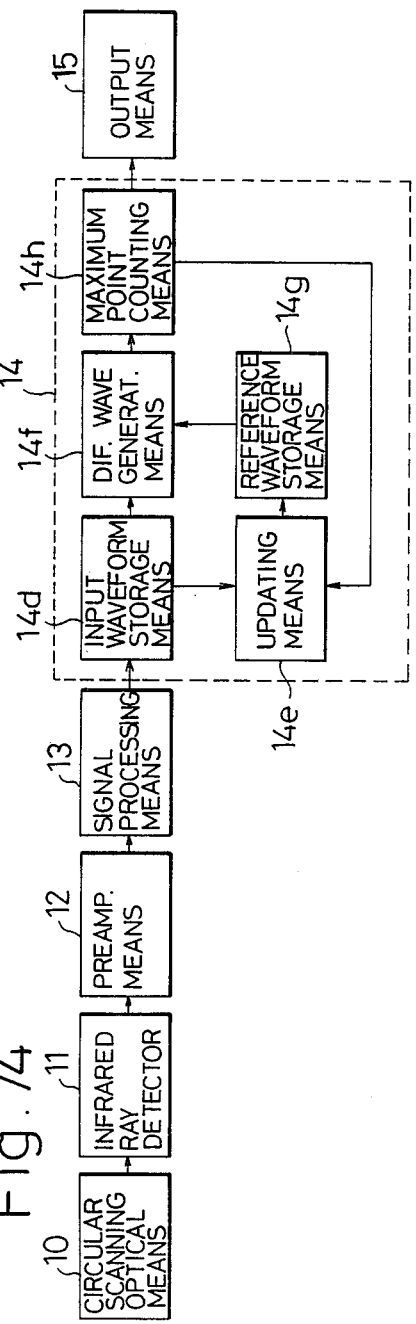
FIG. 74 is a block diagram of another embodiment of the person-number detecting system according to the present invention.
Figure 75:
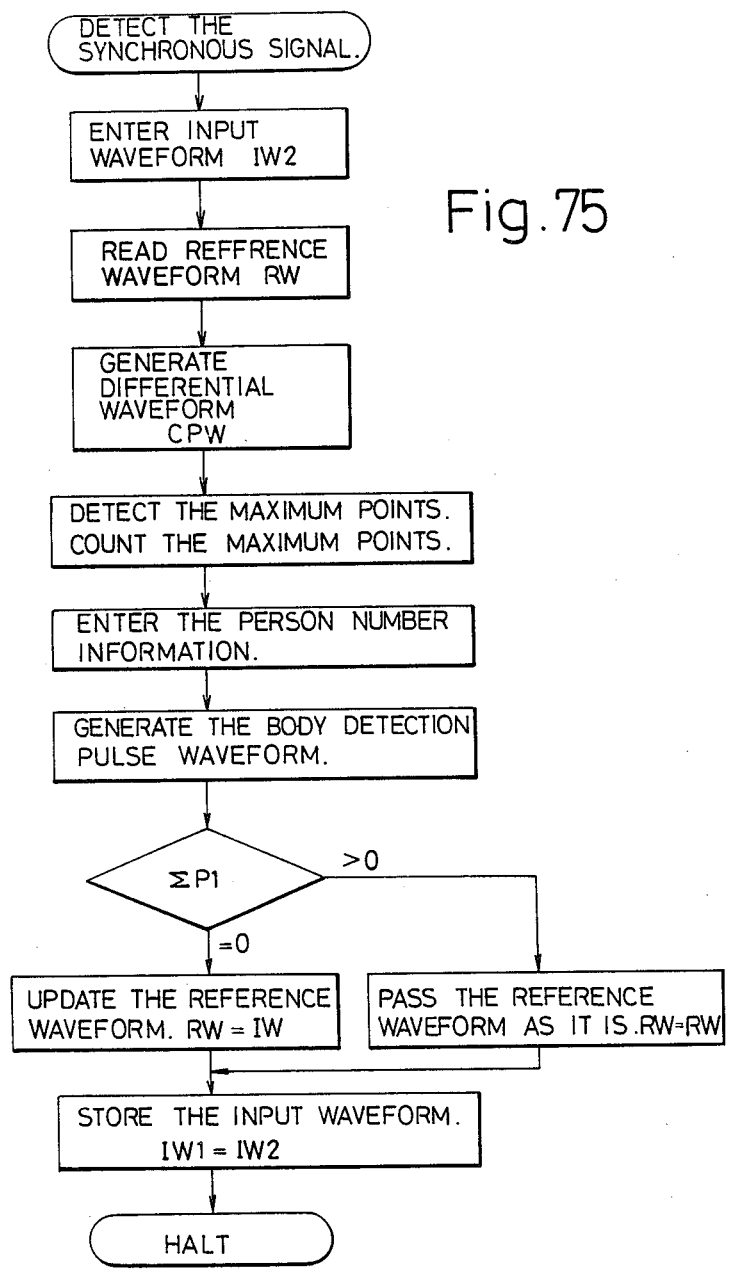
FIG. 75 is a flowchart showing the operation of the system of FIG. 74.

Referring to FIG. 74, the discrimination means 14 in a system of the present invention comprises an input waveform storage means 14d, an updating means 14e for receiving an output of the means 14d, a compared-waveform generating means 14f, a reference waveform storage means 14g for receiving an output of the updating means 14e and for providing its output to the compared waveform means 14f, and a maximum point counting means 14h for receiving an output of the compared waveform generating means 14f and for providing its output to both of an output means 15 at a subsequent stage and the updating means 14e. With such an arrangement, the maximum point counting means 14h counts the compared waveform by an amount corresponding to two periods and, only when the counted result is zero, sends an updating command signal to the updating means 14e. Therefore, even when there appears an incomplete person body input waveform in a transitory period between two circular scanning cycles, counting of the compared waveform for the next cycle is carried out and the updating of the reference waveform is executed, whereby it is positively made possible to prevent any reference waveform having an unfavorable background temperature distribution from being stored (refer to a flowchart of FIG. 75).

Figure 76:
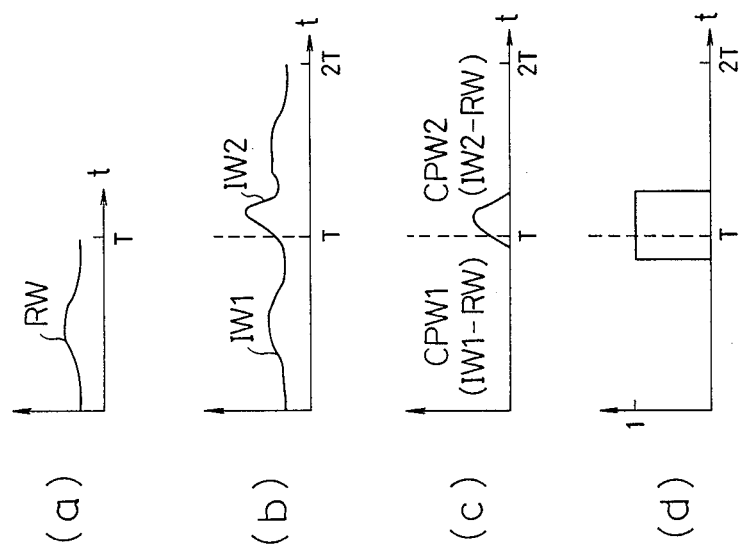
FIG. 76 shows waveforms of signals for explaining the operation of the system of FIG. 74.

Referring to the above more in details with reference also to FIG. 76, it is assumed here that a waveform corresponding to a person appears immediately before a termination of an input waveform IW1 for each scanning cycle. First, the maximum point counting means 14h detects and counts the maximum points on a compared waveform CPW1. In the illustrated example, the number of persons to be detected is judged to be zero because there is no maximum point in the waveform CPW1. Then the maximum counting means 14h detects the maximum points o the compared waveforms CPW1 and CPW2 corresponding to two cycles and generates after or before the detected maximum point such a person body detection pulse waveform as shown in FIG. 76(d), that is, generates such a pulse waveform that has an output level of "1" corresponding to the presence of a person part and has an output level of "0" corresponding to the absence of the person for the other part. The counting means 14h calculates $\Sigma P1$ which is a sum of parts P1 corresponding to the output "1" of the pulse waveform. When $\Sigma P1=0$, it is judged that a person does not exist truely during the scanning cycle of the input waveform IW1, and the reference waveform RW is renewed by the input waveform IW1. It will be appreciated that, if $\Sigma P1>0$, then the reference waveform is not renewed. In this manner, generation of any unfavorable reference waveform can be prevented.

Figure 77:
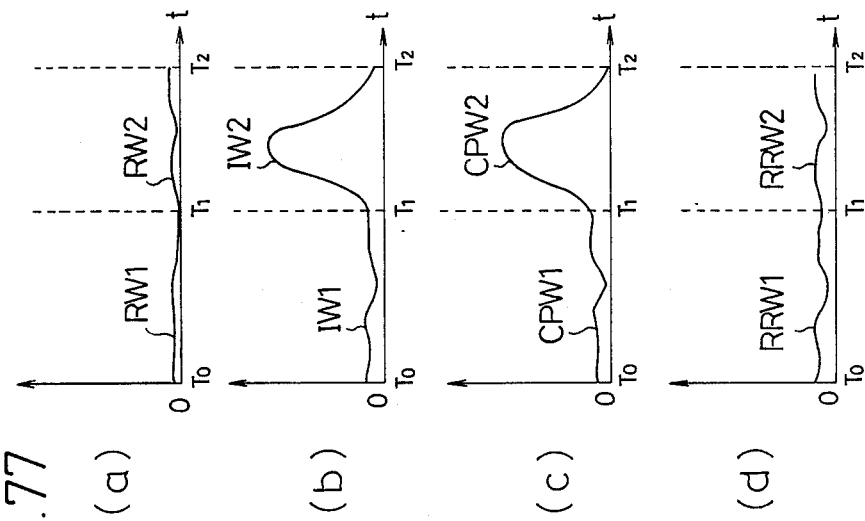
FIG. 77 shows waveforms of signals for explaining the operation of another embodiment of the person-number detecting system according to the present invention.

In the present invention, when no waveform corresponding to a person body appears in the input waveform, the reference waveform will be always updated as mentioned above but, if the person body is detected continuously, then the reference waveform will not be updated. In this connection, it is considered that the background temperature distribution condition largely varies depending on the time of a day, for example, in the early morning and in daytime, and an arrangement capable of coping therewith is provided. That is, referring to FIG. 77, assuming that a part where a person is detected is present in the part CPW2 of the compared waveform CPW as shown in FIG. 77(c), then the other part CPW1 of the compared waveform indicates no detection of a person but is not zero completely, under the influence of variation in the environment. Now suppose that the input waveform IW1 indicative of absence of a person is first set to be a new reference waveform RRW1. Then an average of variations during the person absence part CPW1 is found. That is, am average value cpw of govern by $cpw=\{1/(T_1-T_0)\}\cdot$.

$$\sum_{t=T_0}^{T_1} CPWt.$$

Figure 78:
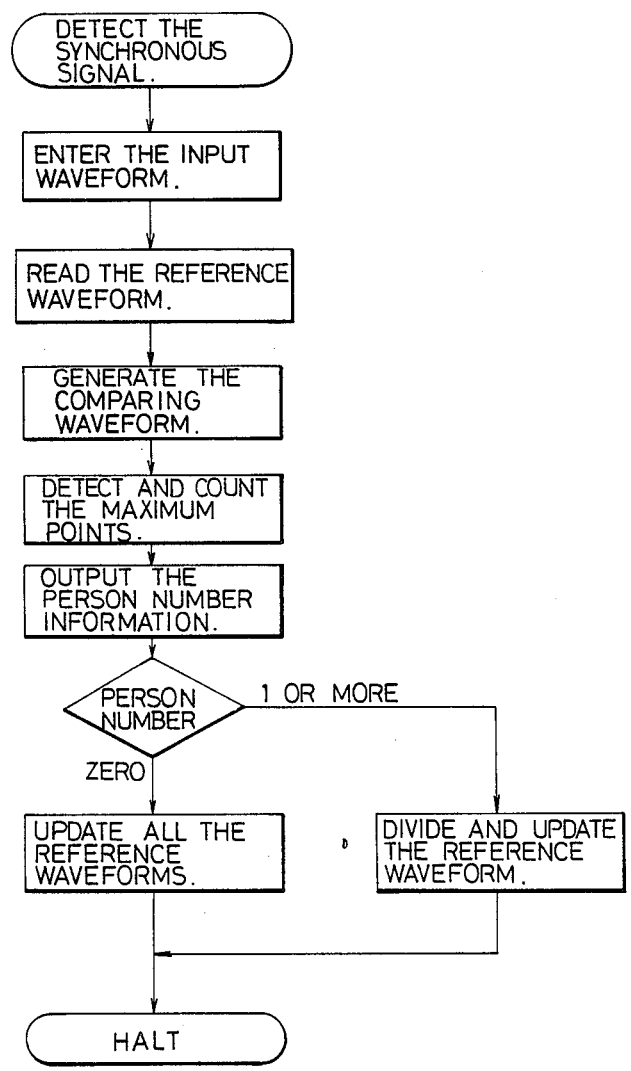
FIG. 78 is a flowchart for explaining the operation of the system performing such an operation as shown in FIG. 77.

This value cpw is added to respective points in the part RW2 of the reference waveform as an average variation component, to renew it to be a new reference waveform RRW2. Practically, the renewal is realized along such a flowchart shown in FIG. 78.

In the above arrangement, the reference waveform is divided into the part RW2 indicative of the presence of a person and a part RW1 indicative of the absence of a person, and the person-absence part RW1, i.e., a part of the reference waveform is renewed. Other arrangement and operation of the present system are substantially the same as those of the foregoing other embodiments.

Figure 79:
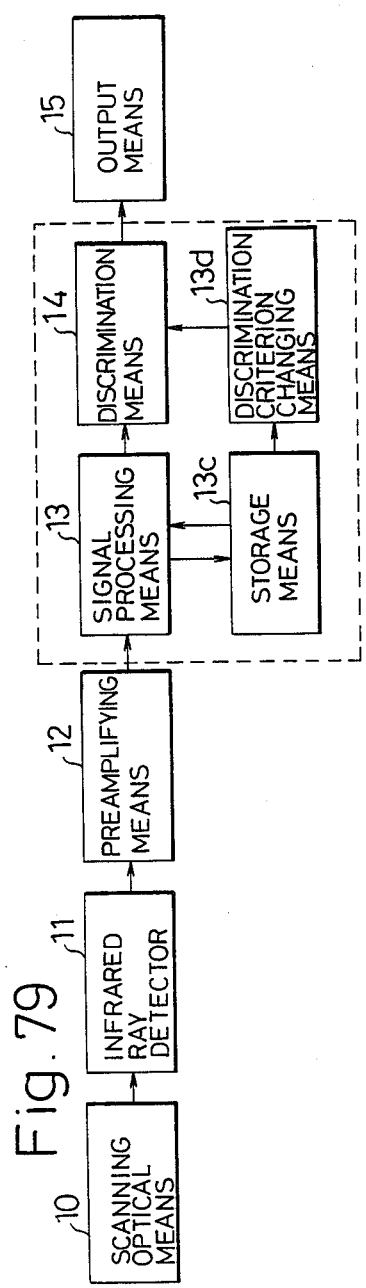
FIG. 79 is a block diagram of another embodiment of th person-number detecting system according to the present invention.

According to another feature of the present invention, there is provided such an arrangement that a discriminating criterion of person detection in the discrimination means is varied in response to a variation in the environmental condition or to the disturbance noise generation state, to enhance a resistance to noises. More specifically, in a system of an embodiment shown in FIG. 79, not only the discrimination means 14 but also the signal processing means 13 are contained in a microcomputer which also contains a discrimination criterion changing means 13d receiving an output of a storage means 13c and sending its output to the discrimination means 14. In the illustrated embodiment, the criterion changing means 13d acts to change the discrimination criterion of the person detection in the discrimination means 14 on the basis of a noise waveform contained in a signal received through the storage means 13c from the signal processing means 13. More practically, as shown in FIG. 80, a waveform corresponding to one cycle immediately before execution of discrimination processing is divided into a variation waveform part HA and noise waveform parts LA other than the part HA, the part HA further includes a crest zone indicative of the presence of a person and a valley zone caused by the lag of the detector, and parameters $S_{TH}$ and $N_{TH}$ (refer to FIG. 81) are determined so that they become discrimination criteria of the discrimination means 14 in judging the person presence part on the basis of the gradient and level of the noise waveforms LA. Methods of determining such parameters include setting of the parameters $S_{TH}$ and $N_{TH}$ to be the maximum gradient and maximum level of the noise waveform LA, respectively, and setting of the parameters $S_{TH}$ and $N_{TH}$ to be, as the highest values, $3\sigma$ times obtained by statistically processing the gradient and level of the noise waveform LA throughout one period, to calculate, for example, a standard deviation $\sigma$.

Figure 82:
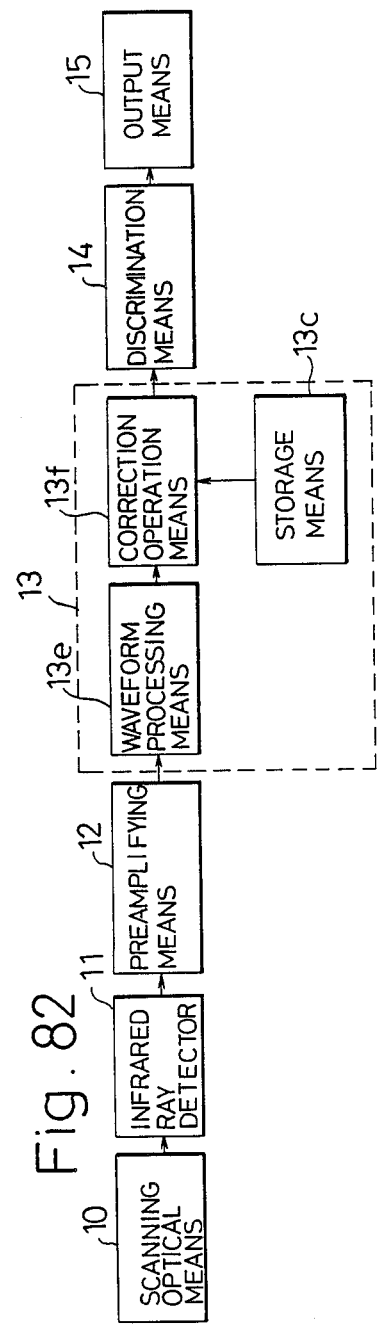
FIG. 82 is a block diagram of another embodiment of the person-number detecting system according to the present invention.
Figure 83:
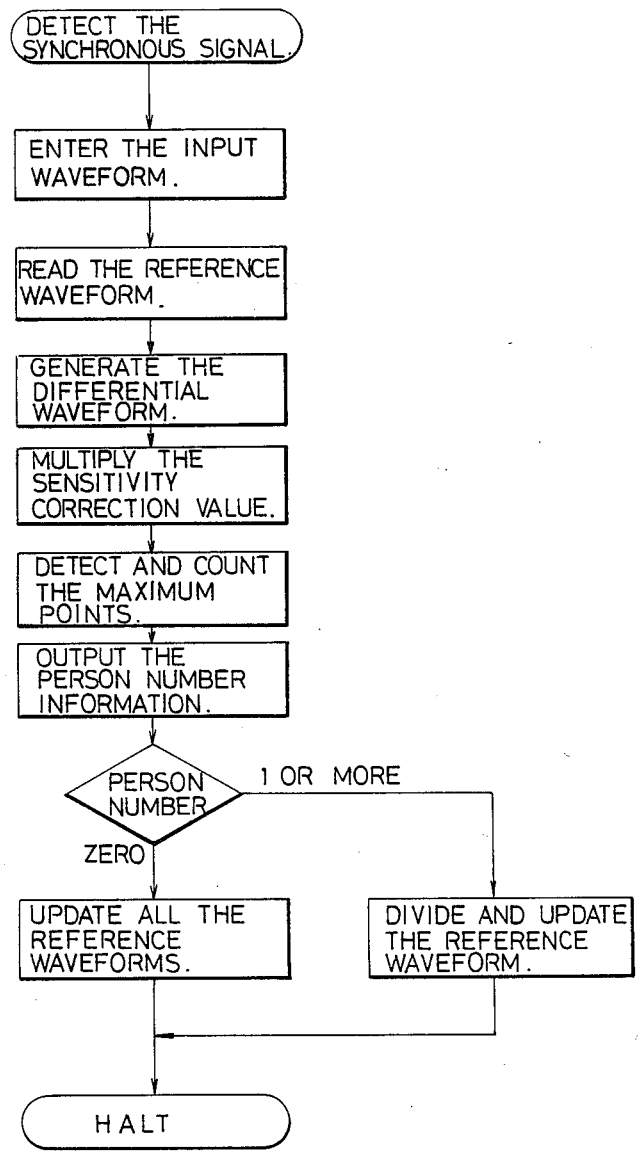
FIG. 83 is a flowchart for explaining the operation of the system of FIG. 82.

According to another feature of the present invention, there is provided an arrangement for preventing erroneous detection of any other heat source than the persons. That is, shown in FIG. 82 is a system of the present embodiment, in which the signal processing means 13 includes a waveform processing means 13e, a storage means 13c, and a correction means 13f for receiving outputs of the waveform processing means 13e and the storage means 13c. In the illustrated embodiment, the storage means 13c preliminarily stores a sensitivity correction value set according to the environment in which the person-number detecting system is installed, and the correction means 13f receives and corrects the output of the storage means 13c. In other words, the correction is executed according to a flowchart of FIG. 83 to realize the detection of the number of persons.

Figure 84:
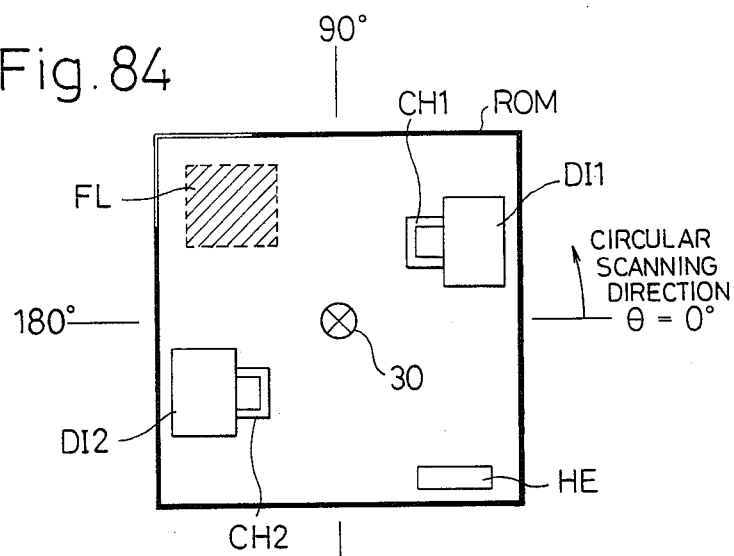
FIG. 84 is a diagram for explaining how the system of FIG. 82 is installed.
Figure 85:
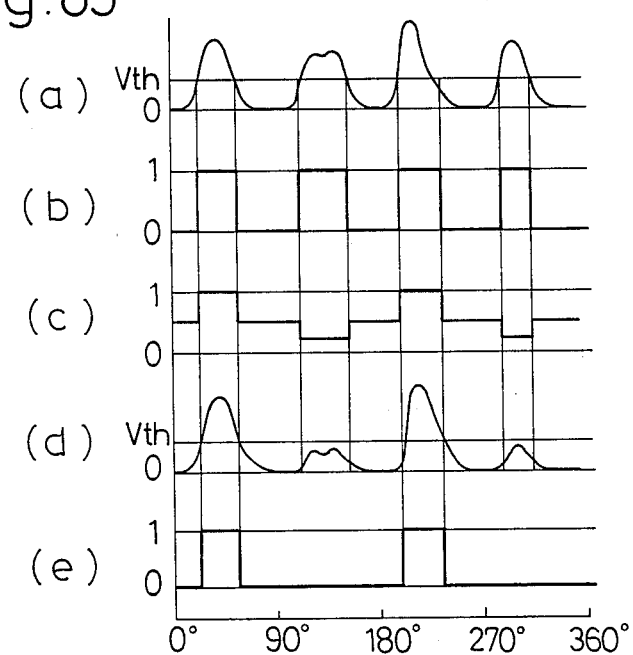
FIG. 85 is a waveform for explaining the operation of the system of FIG. 82.

Now assume that, as shown in FIG. 84, there are desks D11 and D12 and chairs CH1 and CH2 in a room ROM, the system 30 is installed at a ceiling of the room ROM, room floor is partly exposed to sunlight irradiated through a window, and a heater HE is placed in the room. Also suppose that a reference waveform is prepared, for example, at such a time when there is no person in the room ROM, the heater HE is not used and sunlight is not irradiated into the room. In an event where persons sit in the chairs CH1 and CH2, the heater HE is used and sunlight is irradiated into the room at another time, that is, in an event where the room is in its maximum heat state, a compared waveform obtained by subtracting the reference waveform at a time $(t-1)$ from an input waveform at a time t is as shown in FIG. 85(a). Then, extreme points exceeding a threshold value Vth detected in the compared waveform cause four detection outputs generated as shown in FIG. 85(b), but these four outputs do not match the actual number of persons present in the room. In this case, there is highly possible that persons are present at the chairs but less possible that the person is close to the heater or the window. Therefore, when such information is previously placed in the storage means 13c, such sensitivity correction as shown in FIG. 85(c) is applied to the compared waveform, that is, crest parts of non-person in the compared waveform are reduced to below the threshold value Vth as shown in FIG. 85(d) to obtain such an accurate person-number detection output as shown in FIG. 85(e).

Figure 86:
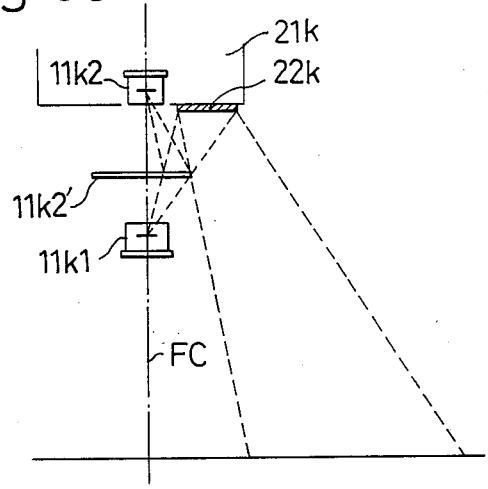
FIG. 86 is a diagram for explaining another embodiment of the circular scanning optical means used in the person-number detecting system according to the present invention.
Figure 88:
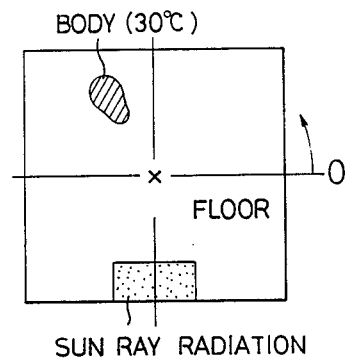
FIG. 88 is a diagram showing a temperature distribution of a detection zone of the system of FIG. 87.
Figure 87:
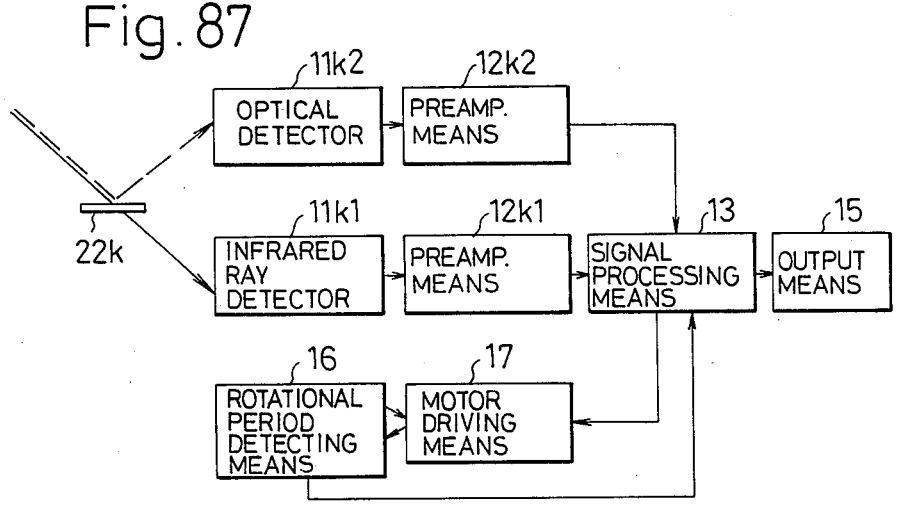
FIG. 87 is a block diagram of another embodiment of the person-number detecting system employing the optical means of FIG. 86 according to the present invention.

According to another feature of the present invention, provided is an arrangement for preventing erroneous detection due to the irradiation of sunlight. Shown in FIGS. 86 and 87 is a system of another embodiment in which, in addition to an infrared ray detector 11k1 for receiving light reflected by a cylindrical mirror 22k mounted on a rotary disc 21k, an optical detector 11k2 and a dichroic mirror 11k2' are arranged on the visual field axial line FC of the element 11k1, the dichroic mirror 11k2' being arranged also to realize light incidence similar to the infrared ray detector 11k1. In the illustrated embodiment, the reflected light energy of sunlight contains much energy of light in a near infrared ray range and thus, if the threshold value of the optical detector 11k2 is set to be sufficiently high, only sunlight can be detected by the optical detector 11k2. When sunlight is detected, the detection input based on sunlight is nullified through a preamplifying means 12k2 and the signal processing means 13. As a result, even if there are two infrared ray inputs from a person body and sunlight in the room as shown, for example, in FIG. 88, only the person body can be accurately detected.

Figure 89:
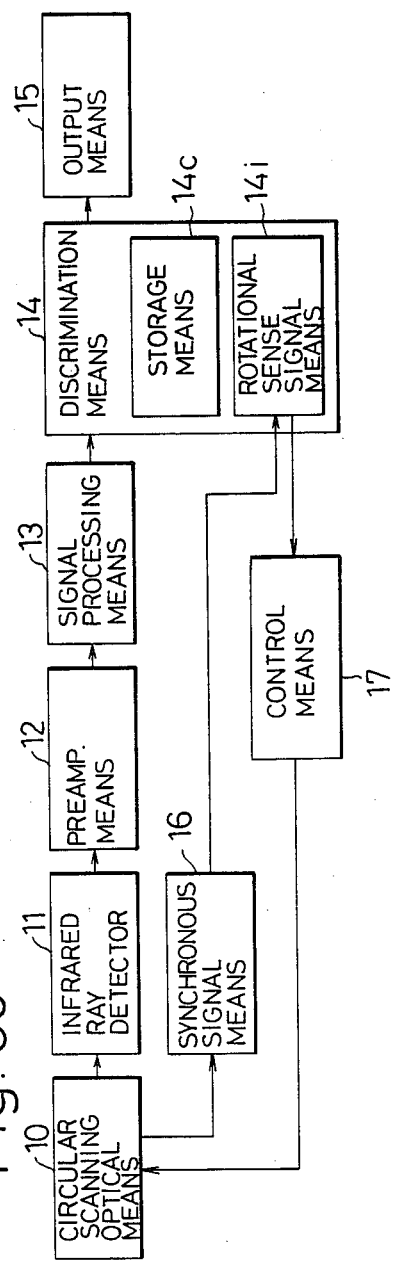
FIGS. 89 and 90 are block diagrams of further embodiments of the person-number detecting system according to the present invention, respectively.
Figure 90:
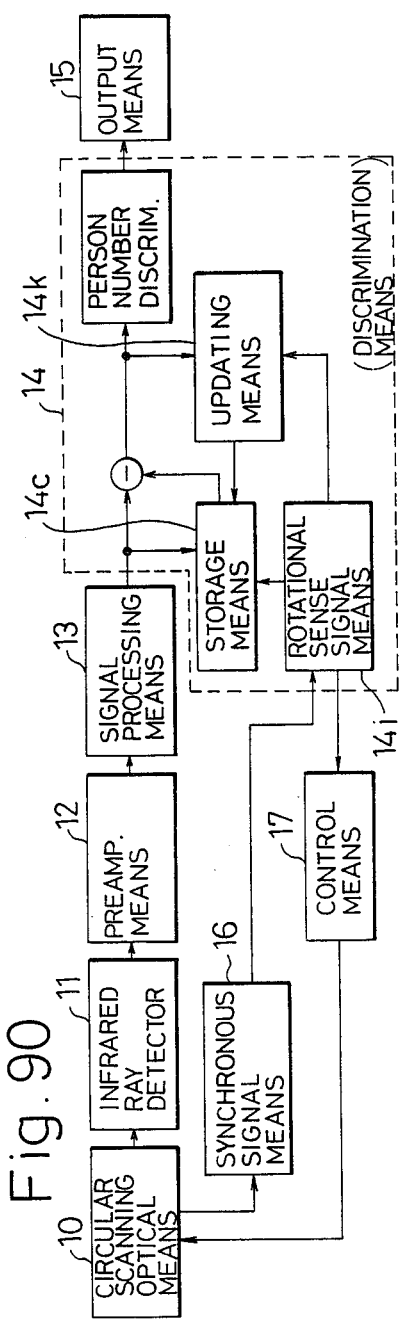

In the person-number detecting systems according to the present invention, the circular scanning direction may be reversible. For example, as shown in FIGS. 89 and 90, a rotational-sense signal generating means 14i is included in the discrimination means 14 to allow the scanning direction reversible at every circular scanning rotation, thereby avoiding such situation that it becomes impossible to detect a weak infrared input from a person body located at a far distance from the system due to a strong infrared ray input from a person body located at a near distance from the system "shading" the weak infrared ray input. In this case, it will be appreciated that when the system is arranged so that every reversal of the scanning causes updating of the reference waveform as shown in FIG. 90, and the detection accuracy can be further improved.

What is claimed as our invention is:

1. A person-number detecting system comprising infrared ray detecting means, optical means for circularly scanning a visual field of said infrared ray detecting means, preamplifying means for amplifying an output signal of said detecting means, signal processing means for converting an output signal of said preamplifying means to a signal for detection of the number of persons in said visual field, means for discriminating the number of persons on the basis of said signal of said signal processing means, and means for providing person-number information on the basis of an output signal of said discriminating means, wherein said circular scanning optical means includes means for restricting said visual field of said infrared ray detecting means in a circular scanning direction, a rotary member bearing said visual field restricting means, and means for driving said rotary member.

2. A system according to claim 1, wherein said rotary member comprises a disc, and said visual field restricting means is an opening provided in said disc.

3. A system according to claim 2, wherein said opening is a slit extending in a radial direction of said disc.

4. A system according to claim 1, wherein said visual field restricting means is a cylindrical mirror.

5. A system according to claim 1, wherein said visual field restricting means is a mirror which has a reflecting surface having a continuously varying concave curvature in said circular scanning direction, and having a curvature in radial direction which provides a focal distance that is much smaller than a distance from said reflecting surface to an object surface, and a rotary axis of said rotary member substantially coincides with a center line of said visual field.

6. A system according to claim 1, wherein said visual field restricting means is a mirror having a reflecting surface which has a continuous varying concave curvature in said circular scanning direction of said scanning means, and has a convex curvature in a radial direction, and said rotary member substantially coincides at a rotary axis with a center line of said visual field.

7. A system according to claim 1, wherein said visual field restricting means sets said visual field to be substantially constant in width in the circular scanning direction and to be gradually higher in optical gain as said visual field deviates from a center line of said visual field.

8. A system according to claim 1, wherein said visual field restricting means divides said visual field on an object surface into a plurality of momentary visual fields in a radial direction of said rotary member.

9. A system according to claim 8, wherein a rotary axis of said rotary member coincides with said visual field center line.

10. A system according to claim 8, wherein said infrared ray detecting means comprises a plurality of infrared ray detectors arranged in a plane normal to a rotary axis of said rotary member and axially symmetrical with respect to the rotary axis.

11. A system according to claim 1, wherein said infrared ray detecting means comprises a pyroelectric element which generates an output current corresponding to a variation in infrared ray energy, said preamplifying means includes a high resistance means for converting said output current of said pyroelectric element into a voltage signal and an amplifier for performing impedance conversion and amplification of a voltage signal obtained from said high resistance, said amplifier being provided with a positive feedback circuit for positive feedback application.

12. A system according to claim 1, wherein said circular scanning direction of said optical means is reversible.

13. A person-number detecting system comprising infrared ray detecting means, optical means for circularly scanning a visual field of said infrared ray detecting means, preamplifying means for amplifying an output signal of said detecting means, signal processing means for converting an output signal of said preamplifying means to a signal for detection of the number of persons in said visual field, means for discriminating the number of persons on the basis of said signal of said signal processing means, and means for providing person-number information on the basis of an output signal of said discriminating means, wherein a rotary axis of said scanning optical means is slanted downwardly closer to a wall on which the system is installed.

14. A system according to claim 13, wherein said visual field formed by said scanning optical means is switched between a near-distance visual field and a far-distance visual field for each half cycle of a scanning cycle.

15. A system according to claim 14, wherein said rotary member is provided thereon with a pair of mirrors which are spaced by a rotational angle of 180 degrees from each other, one of said mirrors being arranged adjacent said rotary axis and the other of said mirrors on the periphery of the rotary member.

16. A person-number detecting system comprising infrared ray detecting means, optical means for circularly scanning a visual field of said infrared ray detecting means, preamplifying means for amplifying an output signal of said detecting means, signal processing means for converting an output signal of said preamplifying means to a signal for detection of the number of persons in said visual field, means for discriminating the number of persons on the basis of said signal of said signal processing means, and means for providing person-number information on the basis of an output signal of said discriminating means, wherein said discriminating means is provided for preliminarily storing as a reference waveform an input waveform received from said signal processing means corresponding to an absence of any person, and for detecting the number of persons by counting maximum values in differential waveforms corresponding to differentials between said reference waveform and a later received input waveform.

17. A system according to claim 16, wherein said discriminating means is arranged to handle as a maximum value a point having zero gradient between a point having a positive gradient larger than a predetermined value and a point having a negative gradient smaller than said predetermined value in an output signal waveform of said signal processing means.

18. A system according to claim 17, wherein said discriminating means includes means for counting as a person number the number of said maximum points in the output signal waveform of said signal processing means and having gradients larger than a predetermined threshold value, and threshold changing means for reducing said threshold value when said maximum point counting means detects a maximum point.

19. A system according to claim 16, wherein said discriminating means comprises a filter for substituting an intrasection minimum value of predetermined section of said output signal from said signal processing means for values at respective time points of the output signal in said section, and a filter for substituting an intrasection maximum value of said predetermined section for values at respective time points of output signals of said intrasection minimum value substituting filter, the maximum value being counted by means of a signal obtained by subtracting an output signal of said intrasection maximum value substituting filter from the output signal of the signal processing means.

20. A system according to claim 16, further comprising means for changing discrimination criteria in person detection of said discriminating means on the basis of a noise waveform contained in the output signal of said signal processing means.

21. A system according to claim 16, wherein said signal processing means includes means for preliminarily storing sensitivity correction values set according to an environmental condition where said system is installed, and means for performing sensitivity correction operation according to said sensitivity correction values stored in said sensitivity correction value storage means.

22. A person-number detecting system comprising infrared ray detecting means, optical means for circularly scanning a visual field of said infrared ray detecting means, preamplifying means for amplifying an output signal of said detecting means, signal processing means for converting an output signal of said preamplifying means to a signal for detection of the number of persons in said visual field, means for discriminating the number of persons on the basis of said signal of said signal processing means, and means for providing person-number information on the basis of an output signal of said discriminating means, wherein said discriminating means includes reference-waveform storage means for storing an input waveform corresponding to the absence of any person, means for storing input waveforms for previous and current cycles, means for generating differential waveforms corresponding to differentials between said previous and current cycle input waveforms stored in said input waveform storage means and said reference waveform stored in said reference waveform storage means, means for counting maximum points in a combined differential waveform of said previous and current cycle differential waveforms corresponding to two cycles and indicative of presence of persons, and renewing means for transferring the input waveform stored in said input waveform storage means to said reference waveform storage means when a counting result of said maximum point counting means is zero.

23. A person-number detecting system comprising infrared ray detecting means, optical means for circularly scanning a visual field of said infrared ray detecting means, preamplifying means for amplifying an output signal of said detecting means, signal processing means for converting an output signal of said preamplifying means to a signal for detection of the number of persons in said visual field, means for discriminating the number of persons on the basis of said signal of said signal processing means, and means for providing person-number information on the basis of an output signal of said discriminating means, wherein said discriminating means is arranged to, in the absence of any person, preliminarily store the input waveform of said signal processing means as a reference waveform, and to discriminate the number of persons on the basis of a difference between the input and reference waveforms, and to sequentially renew parts of the reference waveform other than parts corresponding to persons.

24. A person-number detecting system comprising infrared ray detecting means, optical means for circularly scanning a visual field of said infrared ray detecting means, preamplifying means for amplifying an output signal of said detecting means, signal processing means for converting an output signal of said preamplifying means to a signal for detection of the number of persons in said visual field, means for discriminating the number of persons on the basis of said signal of said signal processing means, and means for providing person-number information on the basis of an output scanning optical means includes an optical detector for detection of near-infrared rays and for nullifying an infrared ray input when receiving an infrared ray input containing such near-infrared rays.

* * * * *